United States Patent
Kamei et al.

(10) Patent No.: US 12,449,701 B2
(45) Date of Patent: Oct. 21, 2025

(54) LIGHT ADJUSTMENT DEVICE

(71) Applicant: Japan Display Inc., Tokyo (JP)

(72) Inventors: Yoshifumi Kamei, Tokyo (JP);
Yoshikatsu Imazeki, Tokyo (JP);
Yoichi Kamijo, Tokyo (JP); Koichi Miyasaka, Tokyo (JP); Shuichi Osawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/771,627

(22) Filed: Jul. 12, 2024

(65) Prior Publication Data
US 2024/0361648 A1 Oct. 31, 2024

Related U.S. Application Data

(63) Continuation of application No. PCT/JP2022/043426, filed on Nov. 24, 2022.

(30) Foreign Application Priority Data

Jan. 26, 2022 (JP) ................................. 2022-009932

(51) Int. Cl.
*G02F 1/1345* (2006.01)
*G02F 1/1343* (2006.01)
*G02F 1/136* (2006.01)

(52) U.S. Cl.
CPC ........ *G02F 1/1345* (2013.01); *G02F 1/13439* (2013.01); *G02F 1/136* (2013.01)

(58) Field of Classification Search
CPC .... G02F 1/1345; G02F 1/13439; G02F 1/136; G02F 1/13458; G02F 1/1347;
(Continued)

(56) References Cited

U.S. PATENT DOCUMENTS

| | | | |
|---|---|---|---|
| 2005/0195488 A1 | 9/2005 | McCabe | |
| 2010/0097551 A1* | 4/2010 | Yamagishi | .......... G02F 1/13471 445/24 |

(Continued)

FOREIGN PATENT DOCUMENTS

| | | |
|---|---|---|
| JP | 10-197906 A | 7/1998 |
| JP | 11-316395 A | 11/1999 |

(Continued)

OTHER PUBLICATIONS

Office Action issued in related Japanese Patent Application No. 2023-576651, mailed on Jan. 21, 2025 and English translation of same. 6 pages.

(Continued)

*Primary Examiner* — Angela M. Medich
(74) *Attorney, Agent, or Firm* — K&L Gates LLP

(57) ABSTRACT

A light adjustment device includes a panel unit in which a plurality of light adjustment panels are stacked in a first direction, each light adjustment panel including a first substrate and a second substrate, the first substrate including a first terminal, the second substrate overlapping the first substrate and including a second terminal, an external coupling wire coupled to at least one of the first and the second terminals, and a conductive member that is provided at an end part of the panel unit in a second direction intersecting the first direction and extends in the first direction.

20 Claims, 27 Drawing Sheets

(58) Field of Classification Search
CPC ............. G02F 1/13471; G02F 1/13473; G02F 1/13475; G02F 1/13476; G02F 1/13478; G09G 2300/023
See application file for complete search history.

(56) References Cited

U.S. PATENT DOCUMENTS

2019/0041680 A1  2/2019  Yoshida et al.
2024/0045136 A1*  2/2024  Lou ................... G02F 1/133608

FOREIGN PATENT DOCUMENTS

| JP | 2004-333567 A | 11/2004 |
| JP | 2009-158755 A | 7/2009 |
| JP | 2020-027210 A | 2/2020 |
| WO | WO2017/175796 A1 | 10/2017 |

OTHER PUBLICATIONS

Search Report issued in related International Patent Application No. PCT/JP2022/043426 mailed on Feb. 7, 2023 and English translation of same. 7 pages.
Written Opinion issued in related International Patent Application No. PCT/JP2022/043426 mailed on Feb. 7, 2023. 4 pages.

* cited by examiner

|  | ELECTRODE | | | |
|---|---|---|---|---|
|  | ARRAY SUBSTRATE | | COUNTER SUBSTRATE | |
| PANEL 1A | 210 (510) | 220 (520) | 330 (530) | 340 (540) |
| PANEL 1B | 210 (510) | 220 (520) | 330 (530) | 340 (540) |
| PANEL 1C | 210 (540) | 220 (530) | 330 (510) | 340 (520) |
| PANEL 1D | 210 (540) | 220 (530) | 330 (510) | 340 (520) |

LIGHT ADJUSTMENT DEVICE

CROSS-REFERENCE TO RELATED APPLICATION

This application is a continuation of International Patent Application No. PCT/JP2022/043426 filed on Nov. 24, 2022 which designates the United States, incorporated herein by reference, and which claims the benefit of priority from Japanese Patent Application No. 2022-009932 filed on Jan. 26, 2022, incorporated herein by reference.

BACKGROUND

1. Technical Field

The present disclosure relates to a light adjustment device.

2. Description of the Related Art

A light adjustment device of Japanese Patent Application Laid-open Publication No. 2004-333567 includes a light adjustment panel. The light adjustment panel includes, for example, an array substrate, a counter substrate, and a liquid crystal layer encapsulated between these substrates. When incident light enters the light adjustment panel, the light transmittance of the incident light is adjusted in the light adjustment panel and this adjusted transmitted light is output from the light adjustment device. The array substrate on the lower side and the counter substrate on the upper side are vertically stacked in the light adjustment panel. The array substrate and the counter substrate are each provided with a terminal. An external coupling wire is coupled to each of the terminals on the array substrate and on the counter substrate in one light adjustment panel. In other words, two external coupling wires are coupled to one light adjustment panel.

It is desirable to reduce the number of external coupling wires such as flexible printed boards used in a light adjustment device.

SUMMARY

A light adjustment device according to an embodiment of the present disclosure includes a panel unit in which a plurality of light adjustment panels are stacked in a first direction, each light adjustment panel including a first substrate and a second substrate, the first substrate including a first terminal, the second substrate overlapping the first substrate and including a second terminal, an external coupling wire coupled to at least one of the first and the second terminals, and a conductive member that is provided at an end part of the panel unit in a second direction intersecting the first direction and extends in the first direction. The conductive member extends from a light adjustment panel positioned closest to one side in the first direction in the panel unit to a light adjustment panel positioned closest to another side, and couples the first terminal on the first substrate and the second terminal on the second substrate in each of the light adjustment panels.

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases. In the following description, an array substrate is also referred to as a first substrate or a lower substrate. A counter substrate is also referred to as a second substrate or an upper substrate.

First Embodiment

Figure 1:
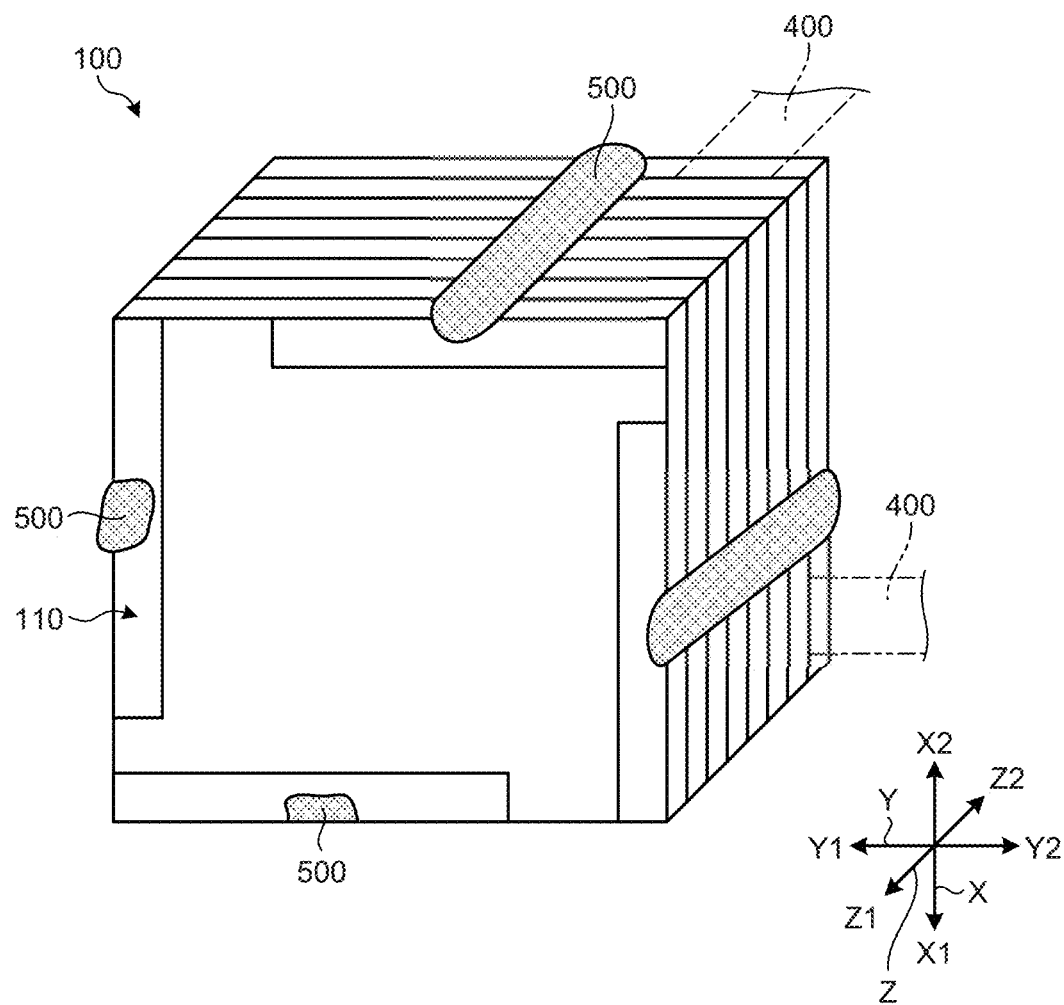
FIG. 1 is a perspective view schematically illustrating a light adjustment device according to a first embodiment.
Figure 2:
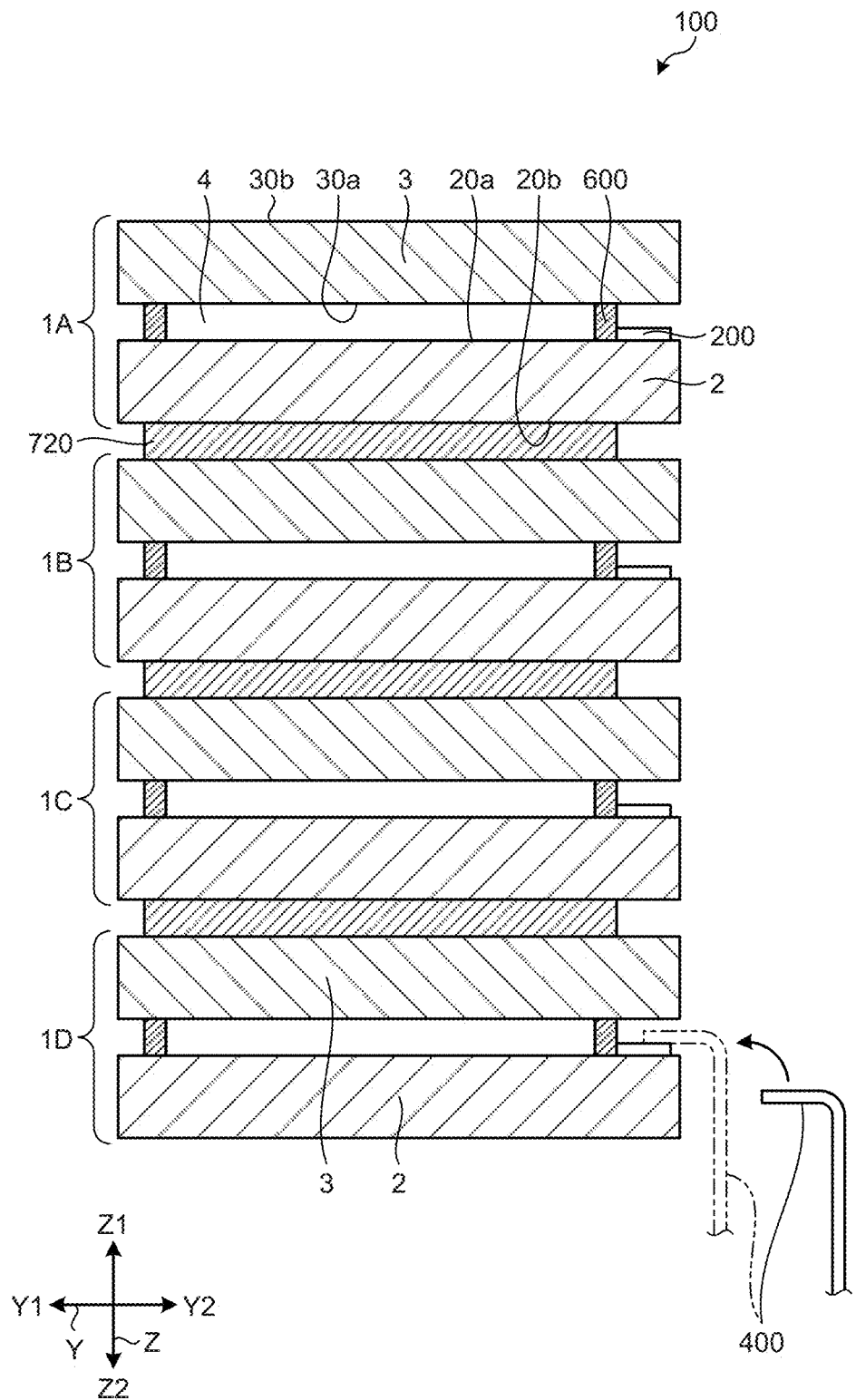
FIG. 2 is a sectional view of the light adjustment device in FIG. 1.
Figure 3:
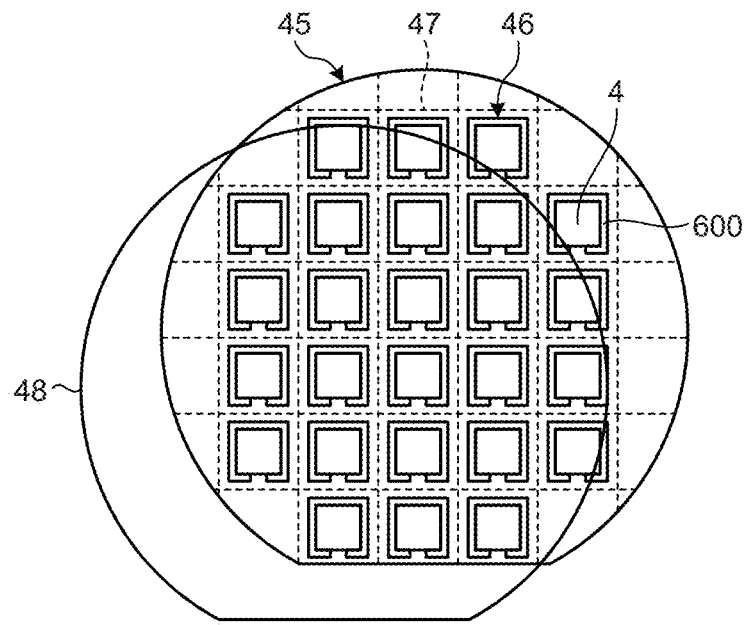
FIG. 3 is a schematic diagram illustrating a wafer provided with a plurality of cells.
Figure 4:
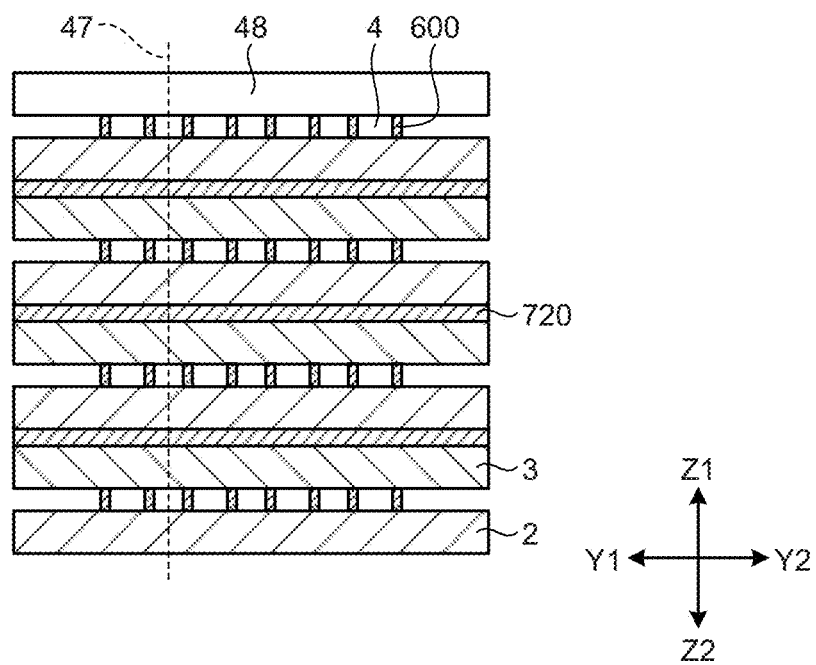
FIG. 4 is a sectional view illustrating a stack of a plurality of layers of the cells in FIG. 3.

FIG. 1 is a perspective view schematically illustrating a light adjustment device according to a first embodiment. FIG. 2 is a cross-sectional view of the light adjustment device in FIG. 1. FIG. 3 is a schematic diagram illustrating a wafer provided with a plurality of cells. FIG. 4 is a cross-sectional view illustrating a stack of a plurality of layers of the cells in FIG. 3.

In an XYZ coordinate system illustrated in the drawings, an X direction is the front-back direction, and an X1 side is opposite an X2 side. The X1 side is also referred to as a front side, and the X2 side is also referred to as a back side. A Y direction is the right-left direction, and a Y1 side is opposite a Y2 side. The Y1 side is also referred to as a left side, and the Y2 side is also referred to as a right side. A Z direction is the up-down direction (stacking direction). A Z1 side is opposite a Z2 side. The Z1 side is also referred to as an upper side, and the Z2 side is also referred to as a lower side. The Z direction is also referred to as a first direction, and the X and Y directions are also referred to as a second direction. For example, one side in the first direction is the Z1 side in the Z direction, and the other side in the first direction is the Z2 side in the Z direction.

As illustrated in FIGS. 1 and 2, a light adjustment device 100 according to the first embodiment includes a panel unit 110, a conductive member 500, and a flexible printed circuit (FPC) 400 which is an example of an external coupling wire. The external coupling wire 400 is not limited to a flexible printed circuit and may be a conductive wire.

As illustrated in FIG. 2, the panel unit 110 in the present embodiment is formed by stacking a plurality (in the embodiment, four) of light adjustment panels 1 in the Z direction (first direction). The light adjustment panels 1 in the present embodiment are each shaped like a square, but the present invention is not limited thereto and includes a polygon such as a pentagon.

Specifically, as illustrated in FIG. 2, the four light adjustment panels 1 are light adjustment panels 1A, 1B, 1C, and 1D stacked in order from the upper side. Each light adjustment panel 1 includes an array substrate 2 disposed on the lower side, a counter substrate 3 disposed on the upper side, a seal 600 provided between the array substrate 2 and the counter substrate 3, a liquid crystal layer 4 filling the inside of the seal 600, and terminals 200. The inside of the seal 600 is an effective region. The array substrate 2 and the counter substrate 3 have the same size when viewed in the Z direction. For example, a terminal 200 on the array substrate 2 in the light adjustment panel 1D positioned lowermost is electrically coupled to the external coupling wire (flexible printed circuit) 400.

Figures 10, 11:
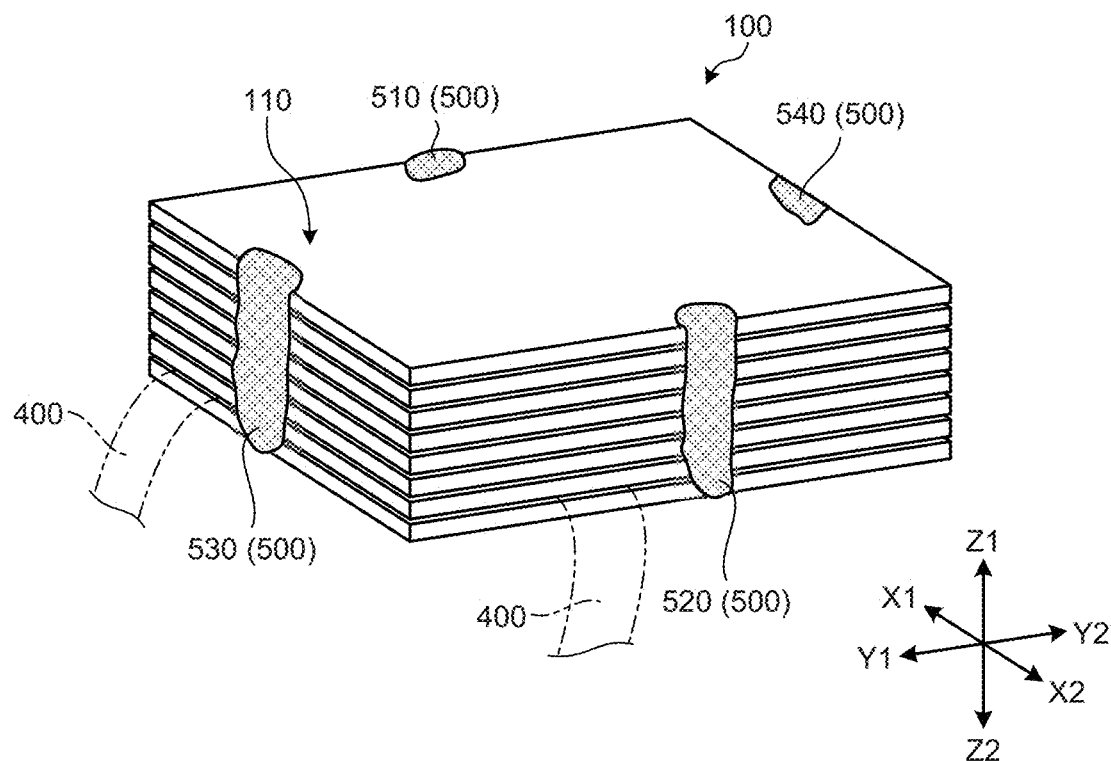
FIG. 10 is a perspective view schematically illustrating the light adjustment device according to the first embodiment in which the four light adjustment panels illustrated in FIG. 9 are stacked.
FIG. 11 is a table listing the relation among four conductive members and conductive members coupled to electrodes on an array substrate and a counter substrate in each light adjustment panel.

The conductive member 500 extends in the up-down direction at a side part of the panel unit 110 (refer to FIG. 10 to be described later). The material of the conductive member 500 is, for example, silver (Ag) or carbon (C). The conductive member 500 is formed by, for example, applying paste containing conductive material to the array substrate 2 or the like and curing the paste.

The following briefly describes a procedure of vertically cutting stacked wafers into pieces to produce the panel unit 110.

As illustrated in FIG. 3, the seals 600 and the liquid crystal layers 4 are disposed at constant intervals on a wafer 45. Dashed lines illustrate division lines 47. In this manner, a plurality of liquid crystal cells are produced on the wafer 45. Subsequently, as illustrated in FIG. 4, the wafers 45 provided with the liquid crystal cells are vertically bonded and stacked by using a translucent bonding agent 720 (for example, OCR). Then, the wafers 45 are cut into pieces by a wire saw, dicing, or the like along the division lines 47 illustrated in FIG. 4. Accordingly, the panel unit 110 is completed.

Figure 5:
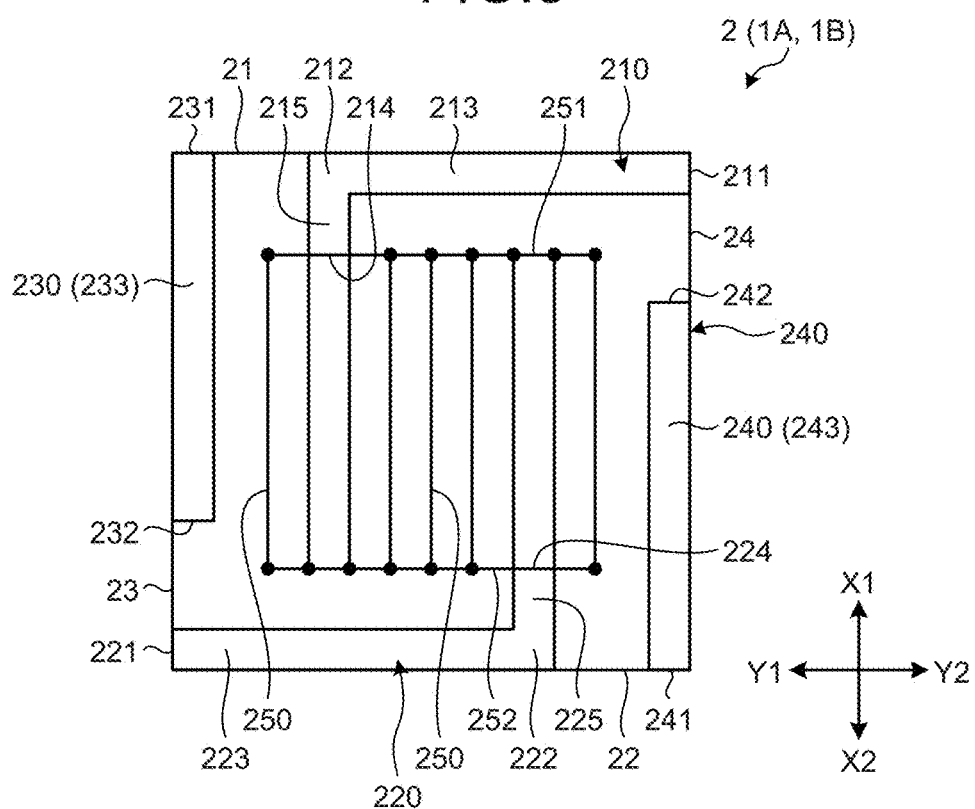
FIG. 5 is a plan view of an array substrate in each of the first and the second light adjustment panels from the top illustrated in FIG. 2.
Figure 6:
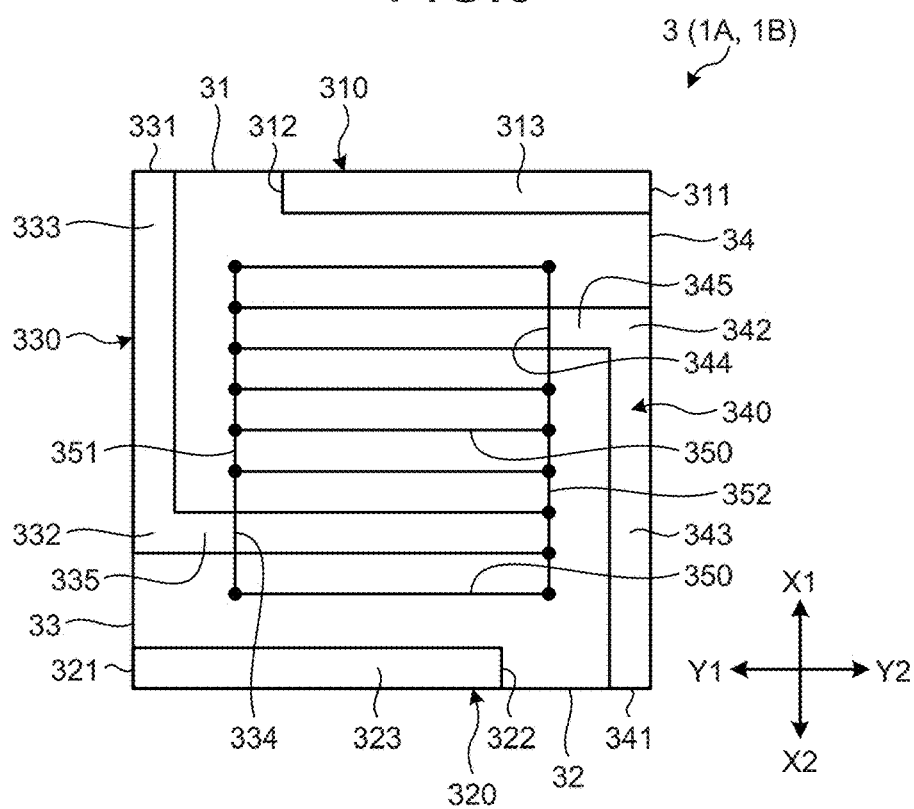
FIG. 6 is a plan view of a counter substrate in each of the first and the second light adjustment panels from the top illustrated in FIG. 2.
Figure 7:
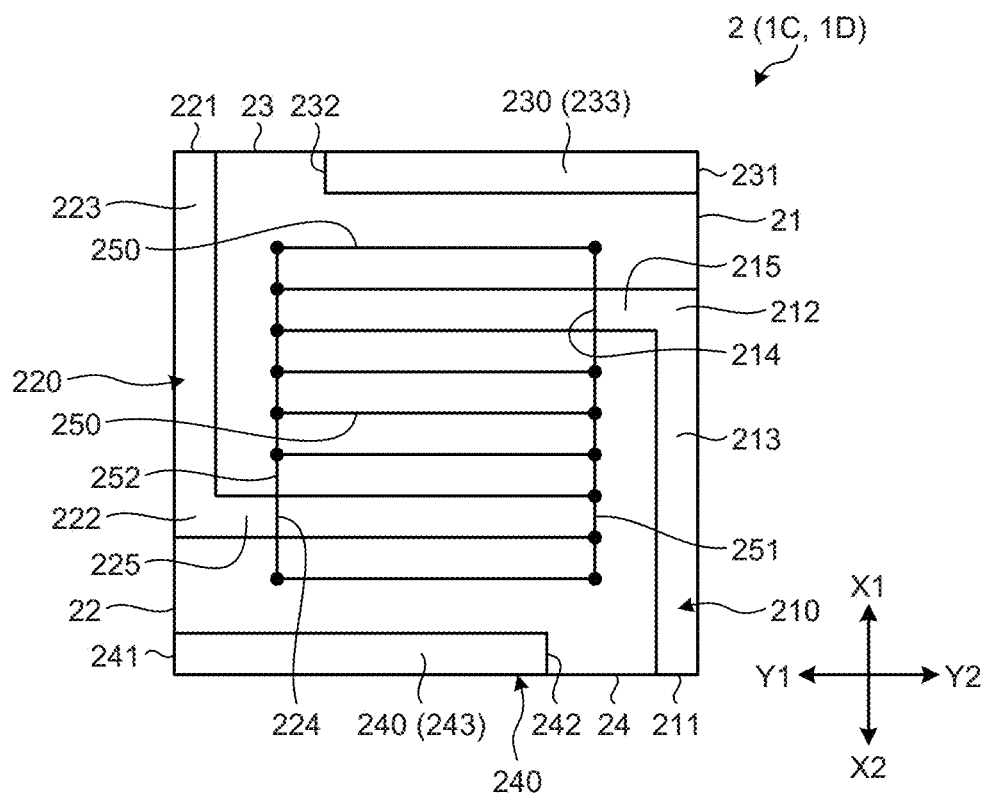
FIG. 7 is a plan view of an array substrate in each of the third and the fourth light adjustment panels from the top illustrated in FIG. 2.
Figure 8:
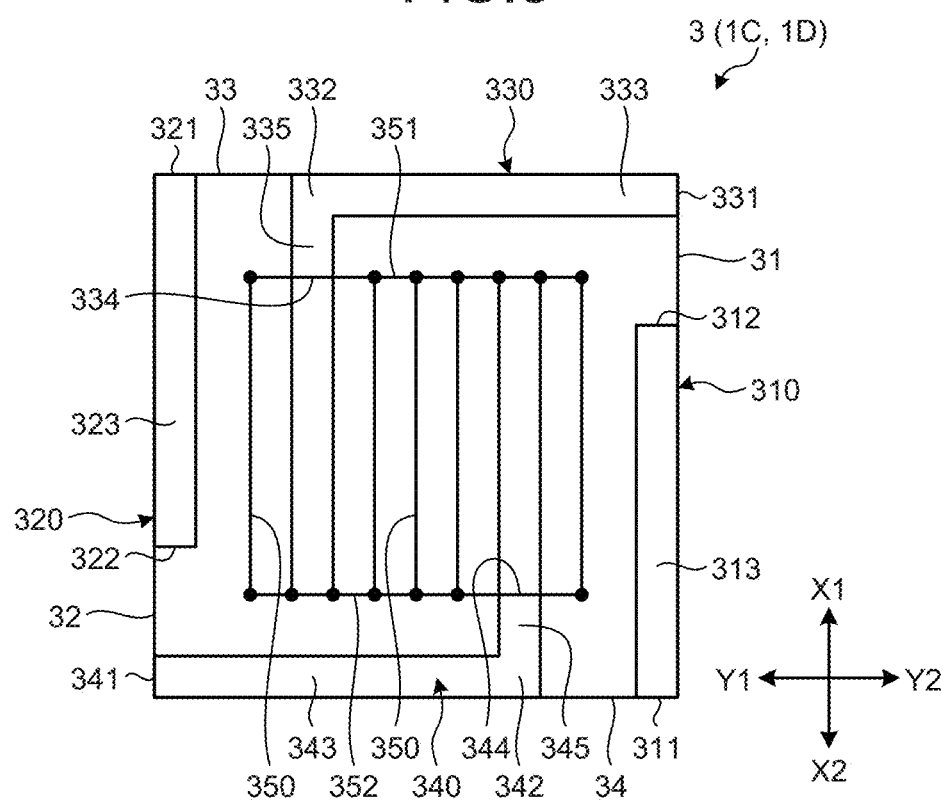
FIG. 8 is a plan view of a counter substrate in each of the first and the second light adjustment panels from the top illustrated in FIG. 2.
Figure 9:
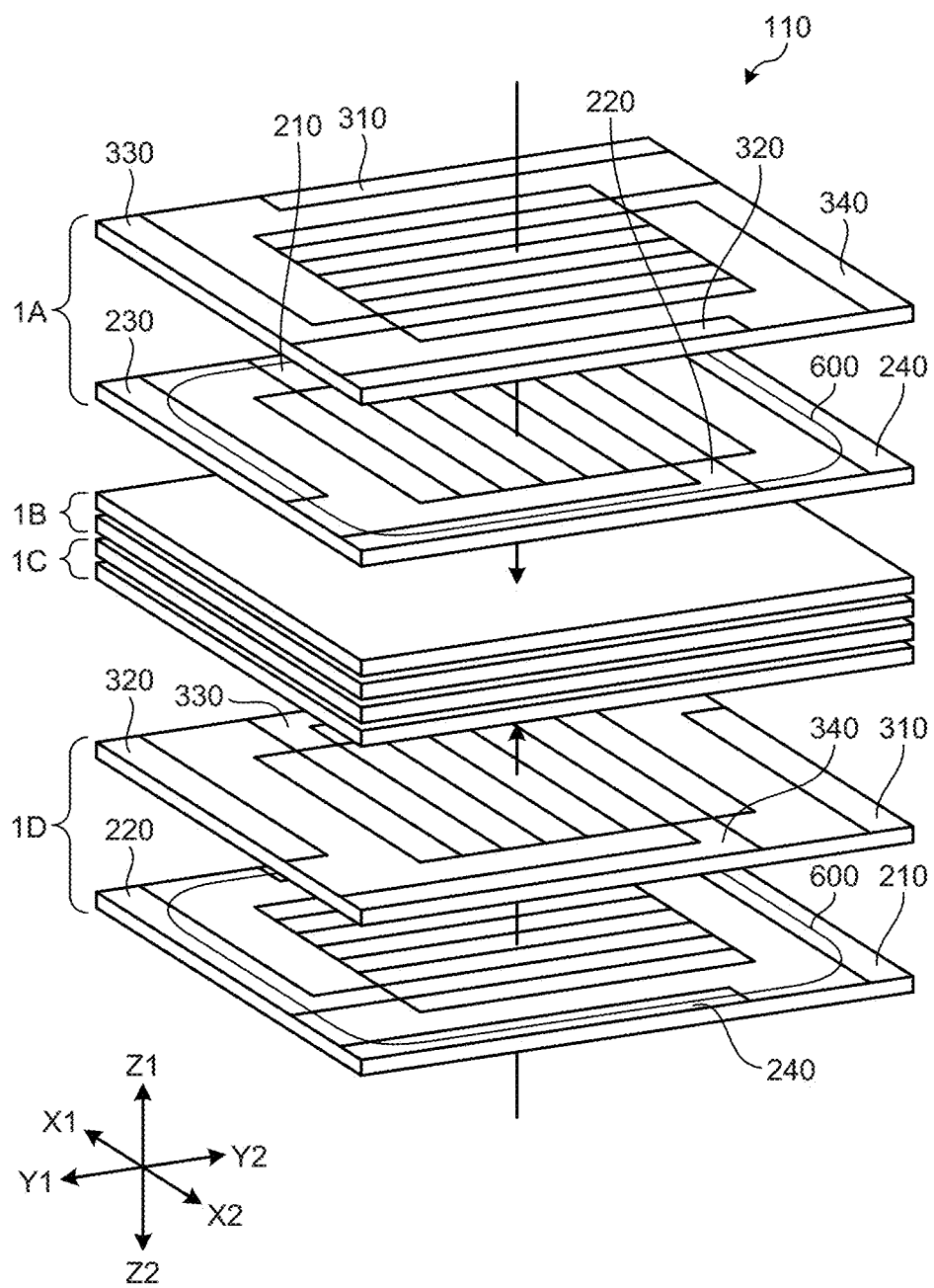
FIG. 9 is an exploded perspective view illustrating a state in which four light adjustment panels are vertically spaced apart.

Wires and terminals on the array substrates 2 and the counter substrates 3 included in the panel unit 110 will be described below in detail. FIG. 5 is a plan view of an array substrate in each of the first and the second light adjustment panels from the top illustrated in FIG. 2. FIG. 6 is a plan view of a counter substrate in each of the first and the second light adjustment panels from the top illustrated in FIG. 2. FIG. 7 is a plan view of an array substrate in each of the third and the fourth light adjustment panels from the top illustrated in FIG. 2. FIG. 8 is a plan view of a counter substrate in each of the first and the second light adjustment panels from the top illustrated in FIG. 2. FIG. 9 is an exploded perspective view illustrating a state in which four light adjustment panels are vertically spaced apart. FIG. 10 is a perspective view schematically illustrating the light adjustment device according to the first embodiment in which the four light adjustment panels illustrated in FIG. 9 are stacked. FIG. 11 is a table listing the relation among four conductive members and conductive members coupled to electrodes on an array substrate and a counter substrate in each light adjustment panel.

As described above, the four light adjustment panels in FIG. 9 are the light adjustment panel 1A, the light adjustment panel 1B, the light adjustment panel 1C, and the light adjustment panel 1D stacked in order from the top.

As illustrated in FIG. 5, the array substrate 2 in each of the light adjustment panels 1A and 1B includes first terminals 210, 220, 230, and 240 and a liquid crystal drive electrode 250. The array substrate 2 has a square shape in plan view and has a first side 21, a second side 22, a third side 23, and a fourth side 24. The first side 21 is positioned on the X1 side. The second side 22 is positioned on the X2 side. The third side 23 is positioned on the Y1 side. The fourth side 24 is positioned on the Y2 side.

The first terminal 210 includes straight parts 213 and 215. The straight parts 213 and 215 are wide strip-shaped bodies. The straight part 213 extends from an end 211 to an end 212. The straight part 213 extends along the first side 21. The straight part 215 extends from the end 212 to an end 214. The end 214 is coupled to a wire 251. The liquid crystal drive electrode 250 is provided at the center of the array substrate 2 and is electrically coupled to the wire 251. The wire 251 extends in the Y direction. A plurality of the liquid crystal drive electrodes 250 are provided and each extend in the X direction.

The first terminal 220 includes straight parts 223 and 225. The straight parts 223 and 225 are wide strip-shaped bodies. The straight part 223 extends from an end 221 to an end 222. The straight part 223 extends along the second side 22. The straight part 225 extends from the end 222 to an end 224. The end 224 is coupled to a wire 252. The wire 252 is coupled to the liquid crystal drive electrodes 250. The wire 252 extends in the Y direction.

The first terminal 230 includes a straight part 233. The straight part 233 is a wide strip-shaped body. The straight part 233 extends from an end 231 to an end 232. The straight part 233 extends along the third side 23.

The first terminal 240 includes a straight part 243. The straight part 243 is a wide strip-shaped body. The straight part 243 extends from an end 241 to an end 242. The straight part 243 extends along the fourth side 24.

As illustrated in FIG. 6, the counter substrate 3 in each of the light adjustment panels 1A and 1B includes second terminals 310, 320, 330, and 340 and a liquid crystal drive electrode 350. The counter substrate 3 has a square shape in plan view and has a first side 31, a second side 32, a third side 33, and a fourth side 34. The first side 31 is positioned on the X1 side. The second side 32 is positioned on the X2 side. The third side 33 is positioned on the Y1 side. The fourth side 34 is positioned on the Y2 side.

The second terminal 310 includes a straight part 313. The straight part 313 is a wide strip-shaped body. The straight part 313 extends from an end 311 to an end 312. The straight part 313 extends along the first side 31.

The second terminal 320 includes a straight part 323. The straight part 323 is a wide strip-shaped body. The straight part 323 extends from an end 321 to an end 322. The straight part 323 extends along the second side 32.

The second terminal 330 includes straight parts 333 and 335. The straight parts 333 and 335 are wide strip-shaped bodies. The straight part 333 extends from an end 331 to an end 332. The straight part 333 extends along the third side 33. The straight part 335 extends from the end 332 to an end 334. The end 334 is coupled to a wire 351. The liquid crystal drive electrode 350 is provided at the center of the counter substrate 3 and is electrically coupled to the wire 351. The wire 351 extends in the X direction. A plurality of the liquid crystal drive electrodes 350 are provided and each extend in the Y direction.

The second terminal 340 includes straight parts 343 and 345. The straight parts 343 and 345 are wide strip-shaped bodies. The straight part 343 extends from an end 341 to an end 342. The straight part 343 extends along the fourth side 34. The straight part 345 extends from the end 342 to an end 344. The end 344 is coupled to a wire 352. The wire 352 is electrically coupled to the liquid crystal drive electrodes 350. The wire 352 extends in the X direction.

The light adjustment panels 1C and 1D, which will be described below, are obtained by rotating the light adjustment panels 1A and 1B by 90° in the clockwise direction (rightward direction). Thus, the positions of the wires, terminals, and electrodes of the array substrate 2 and the counter substrate 3 included in each of the light adjustment panels 1C and 1D are obtained by rotating the positions of the wires, terminals, and electrodes of the array substrate 2 and the counter substrate 3 included in each of the light adjustment panels 1A and 1B by 90° in the clockwise direction (rightward direction).

As illustrated in FIG. 9, the light adjustment panels 1A, 1B, 1C, and 1D are vertically stacked to produce the panel unit 110. Subsequently, the conductive member 500 is provided at each side part of the panel unit 110 as illustrated in FIG. 10. Specifically, four conductive members 510, 520, 530, and 540 are provided at side parts of the respective sides of the panel unit 110. Specifically, each conductive member 500 is formed by, for example, applying paste containing conductive material such as silver or carbon to each side part of the panel unit 110 and then curing the paste. The paste is applied to electrically couple a terminal 200 on the array substrate 2 and a terminal 200 on the counter substrate 3 in each light adjustment panel 1. Thus, the terminal 200 on the array substrate 2 and the terminal 200 on the counter substrate 3 in each light adjustment panel 1 are electrically coupled to each other through the conductive member 500. Accordingly, each conductive member 500 electrically couples a terminal 200 on the array substrate 2 and a terminal 200 on the counter substrate 3 in the light adjustment panel 1D, a terminal 200 on the array substrate 2 and a terminal 200 on the counter substrate 3 in the light adjustment panel 1C, a terminal 200 on the array substrate 2 and a terminal 200 on the counter substrate 3 in the light adjustment panel 1B, and a terminal 200 on the array substrate 2 and a terminal 200 on the counter substrate 3 in the light adjustment panel 1A.

A table in FIG. 11 will be described below. For example, 210(510) written in the column of "array substrate" for the light adjustment panel 1A means that the first terminal 210 illustrated in FIG. 5 is coupled to the conductive member 510. As illustrated in FIG. 5, the first terminal 210 is positioned on the X1 side. As illustrated in FIG. 10, the conductive member 510 is positioned on the X1 side as well. Accordingly, the conductive member 510 and the first terminal 210 both disposed on the X1 side are electrically coupled to each other.

In addition, 340(520) written in the column of "counter substrate" for the light adjustment panel 1D means that the second terminal 340 illustrated in FIG. 8 is coupled to the conductive member 520. As illustrated in FIG. 8, the second terminal 340 is positioned on the X2 side. As illustrated in FIG. 10, the conductive member 520 is positioned on the X2 side as well. Accordingly, the conductive member 520 and the second terminal 340 both disposed on the X2 side are electrically coupled to each other. In the light adjustment device 100 according to the present embodiment, liquid crystal cells for p-wave polarization and liquid crystal cells for s-wave polarization are stacked and combined.

Figure 12:
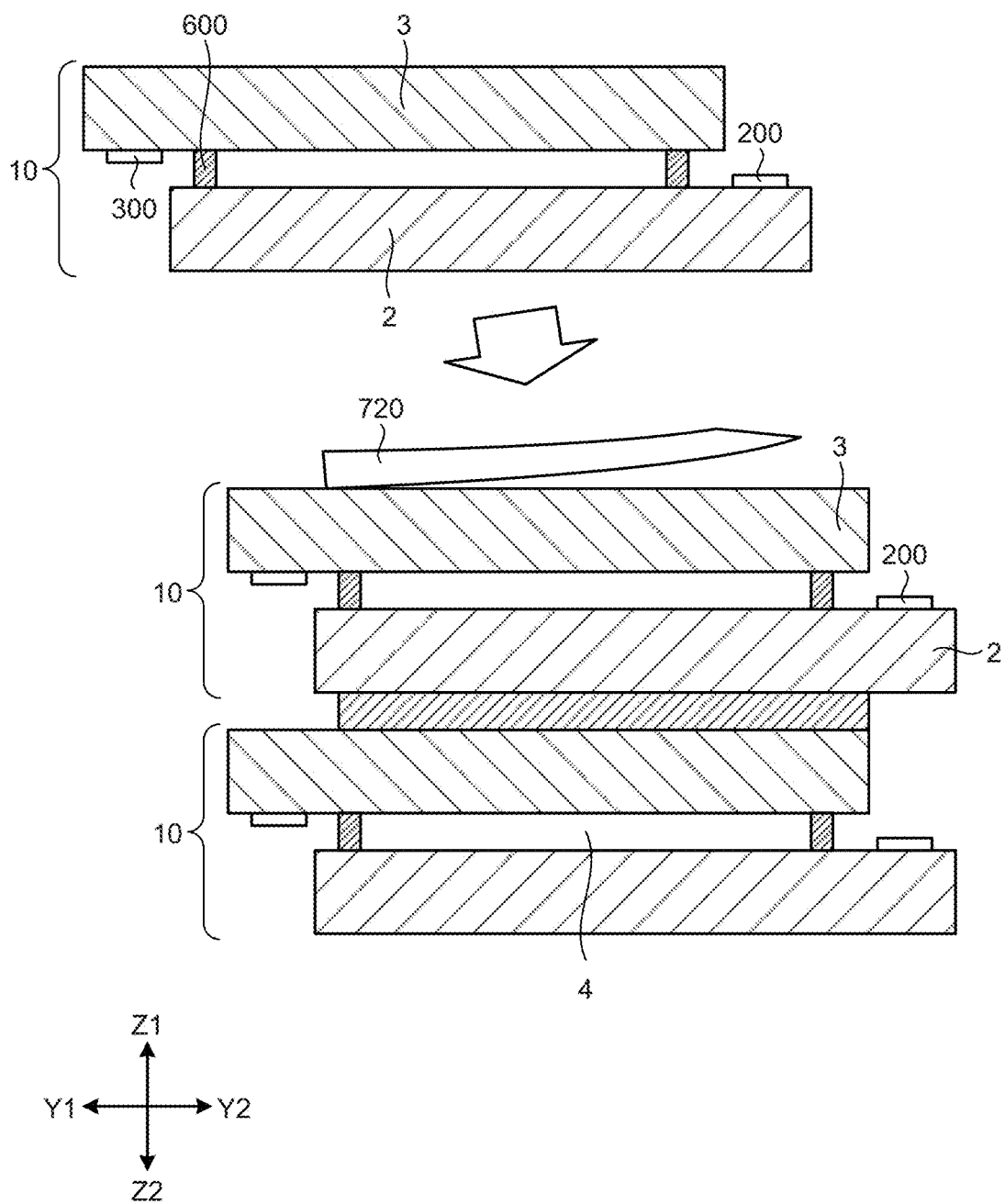
FIG. 12 is a schematic diagram illustrating a state in which light adjustment panels are stacked in a panel unit according to a first comparative example.
Figure 13:
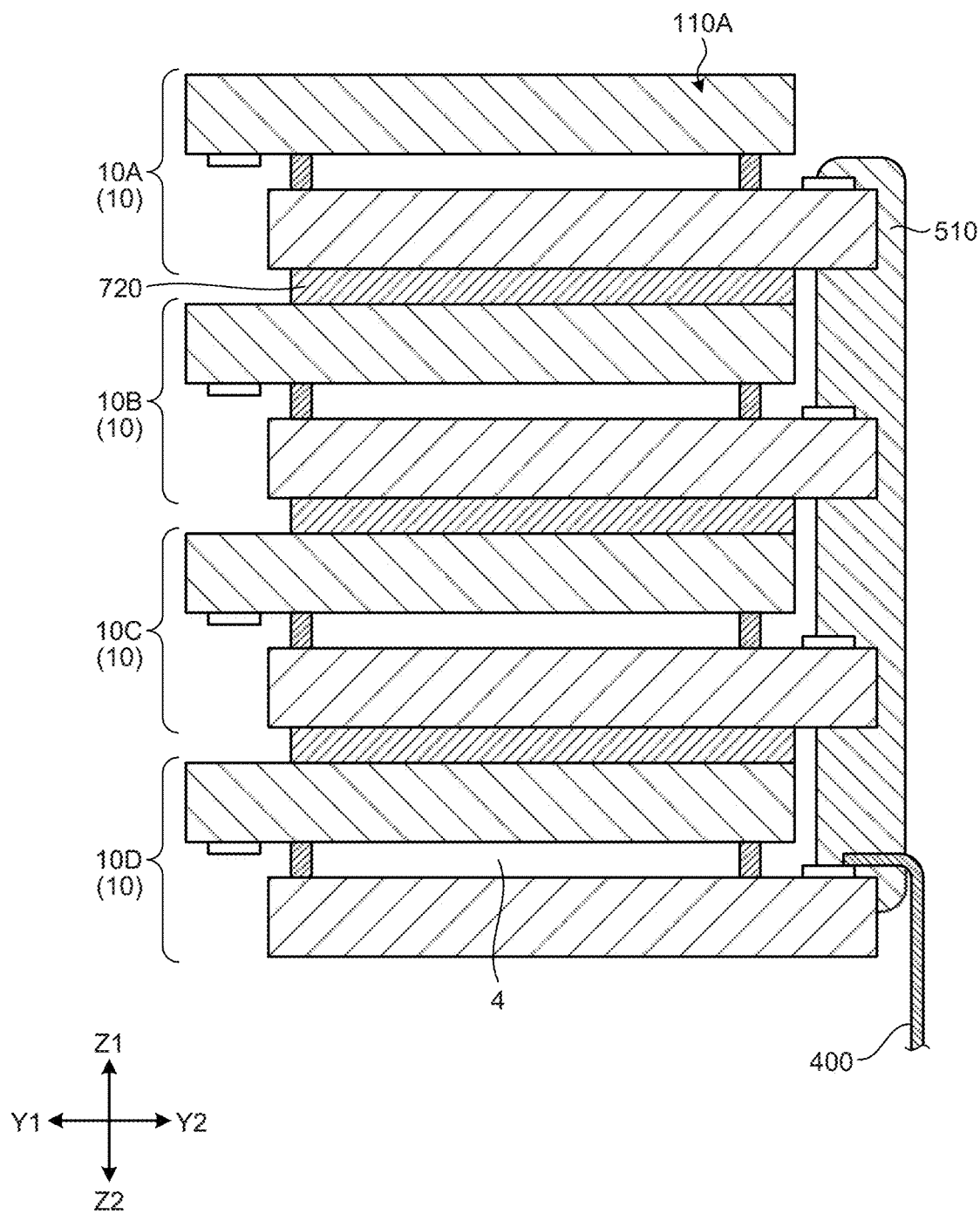
FIG. 13 is a schematic diagram illustrating a state in which the panel unit according to the first comparative example is provided with one conductive member.
Figure 14:
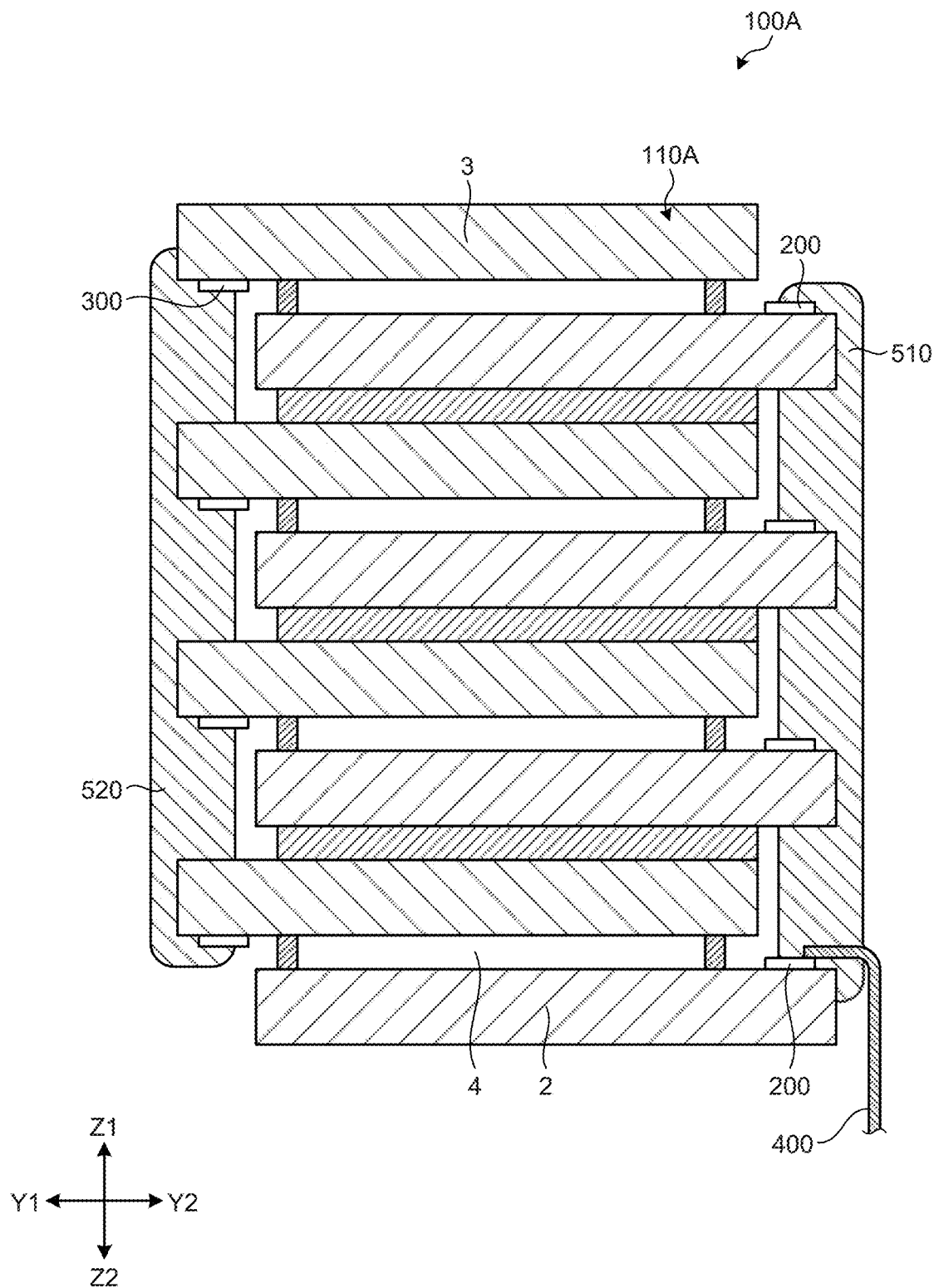
FIG. 14 is a schematic diagram illustrating a light adjustment device according to the first comparative example.

A first comparative example will be described below. FIG. 12 is a schematic diagram illustrating a state in which light adjustment panels are stacked in a panel unit according to the first comparative example. FIG. 13 is a schematic diagram illustrating a state in which the panel unit according to the first comparative example is provided with one conductive member. FIG. 14 is a schematic diagram illustrating a light adjustment device according to the first comparative example.

As illustrated in FIGS. 12 to 14, each counter substrate 3 is shifted relative to the corresponding array substrate 2 in the Y direction in a light adjustment device 100A and a panel unit 110A according to the first comparative example. Specifically, the counter substrate 3 is shifted on the Y1 side relative to the array substrate 2. Moreover, the counter substrate 3 is not oppositely disposed above a terminal 200 on the array substrate 2. The array substrate 2 is not oppositely disposed below a terminal 300 on the counter substrate 3. The following briefly describes a procedure of producing the light adjustment device 100A according to the first comparative example.

First, light adjustment panels 10 each including the array substrate 2, the counter substrate 3, the seal 600, and the liquid crystal layer 4 are vertically stacked as illustrated in FIG. 12. The translucent bonding agent 720 as an optical adhesive sheet such as OCA is used to join the upper light adjustment panel 10 and the lower light adjustment panel 10. Accordingly, the panel unit 110A is produced as illustrated in FIG. 13. As illustrated in FIG. 13, light adjustment panels 10A, 10B, 10C, and 10D are stacked in that order from the top in the panel unit 110A.

Subsequently, the conductive member 510 is provided at a side part of the panel unit 110A on one side (the Y2 side) as illustrated in FIG. 13. The conductive member 510 vertically connects the corresponding terminal 200 on the array substrate 2 in each light adjustment panel 10. In addition, the conductive member 520 is provided at a side part of the panel unit 110A on the other side (Y1 side) as illustrated in FIG. 14. The conductive member 520 vertically connects the corresponding terminal 300 on the counter substrate 3 in each light adjustment panel 10. The external coupling wire 400 is coupled to, for example, the terminal 200 on the array substrate 2 in the light adjustment panel 10 positioned lowermost.

Figure 15:
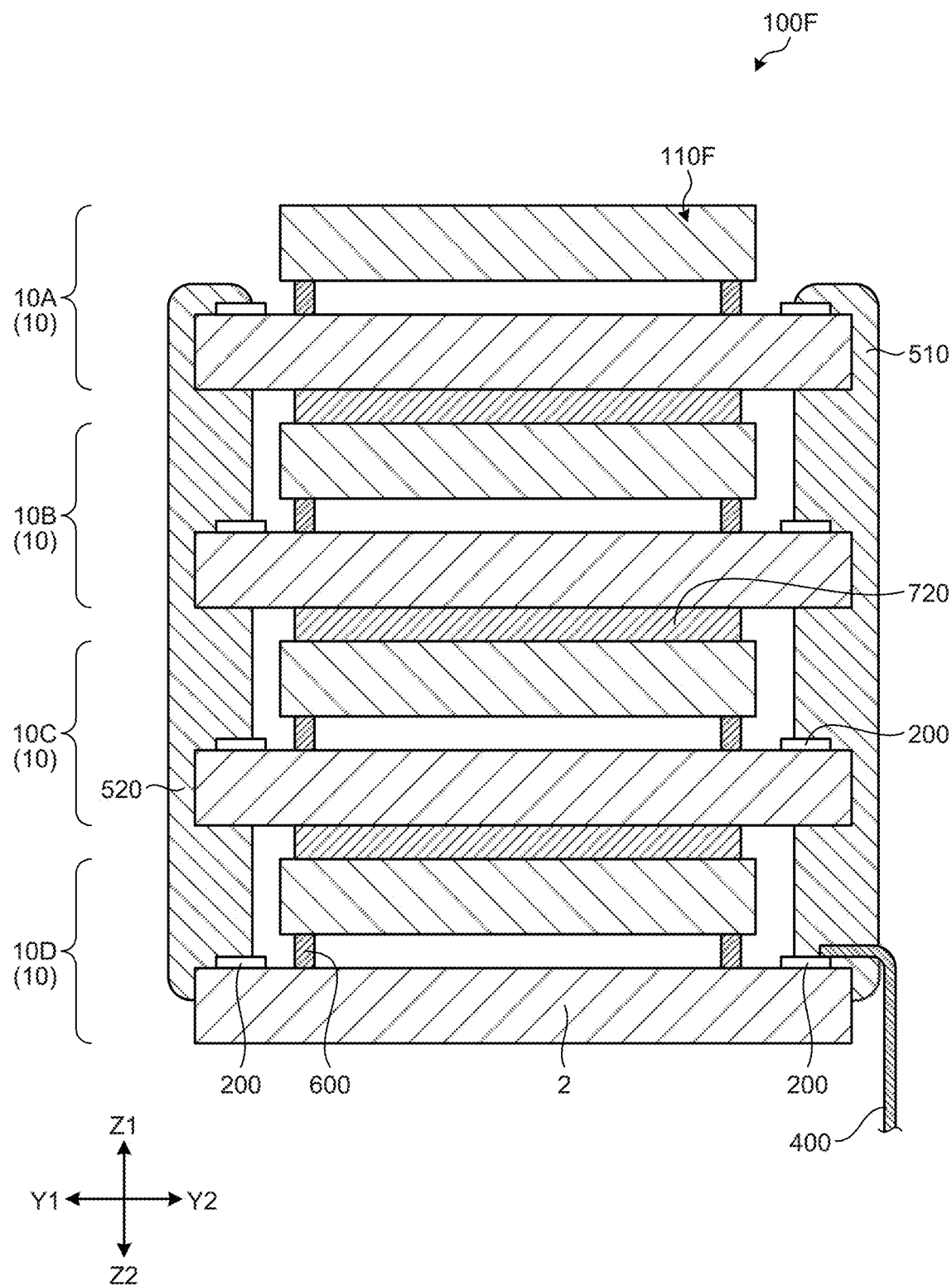
FIG. 15 is a schematic diagram illustrating a light adjustment device according to a second comparative example.

A second comparative example will be described below. FIG. 15 is a schematic diagram illustrating a light adjustment device according to the second comparative example.

As illustrated in FIG. 15, the conductive members 510 and 520 are coupled to the terminals 200 on each array substrate 2 but not coupled to each counter substrate 3 in a light adjustment device 100F and a panel unit 110F according to the second comparative example. A terminal 200 on each array substrate 2 is vertically connected by the conductive member 510 and coupled to the external coupling wire 400 through a terminal 200 in the light adjustment panel 10D. The following briefly describes the light adjustment device 100F according to the second comparative example.

As illustrated in FIG. 15, the light adjustment panels 10 are vertically stacked to form the panel unit 110F. Each light adjustment panel 10 includes the array substrate 2, the counter substrate 3, the seal 600, and the liquid crystal layer 4. The array substrate 2 is larger than the counter substrate 3. Specifically, the array substrate 2 is formed larger than the counter substrate 3 in the X and Y directions, and the terminal 200 provided at each side of the array substrate 2 is exposed from the counter substrate 3 when viewed in the Z1 side. The counter substrate 3 is provided with no terminals. The light adjustment panels 10A, 10B, 10C, and 10D are stacked in that order from the top in the panel unit 110F.

The conductive member 510 is provided at a side part of the panel unit 110F on the one side (Y2 side). The conductive member 510 vertically connects the corresponding terminal 200 on the array substrate 2 in each light adjustment panel 10. In addition, the conductive member 520 is provided at a side part of the panel unit 110F on the other side (Y1 side). The conductive member 520 vertically connects the corresponding terminal 200 on the array substrate 2 in each light adjustment panel 10. The external coupling wire (flexible printed circuit) 400 is coupled to, for example, a terminal 200 on the array substrate 2 in the light adjustment panel 10D positioned lowermost.

As described above, the light adjustment device 100 of the first embodiment includes: the panel unit 110 in which the light adjustment panels 1A, 1B, 1C, and 1 are stacked in the up-down direction (first direction; Z direction), each light adjustment panel including the array substrate 2 (first substrate) and the counter substrate 3, the array substrate 2 including the first terminals 210, 220, 230, and 240, the counter substrate 3 including the second terminals 310, 330, 330, and 340; the external coupling wire (flexible printed circuit) 400 coupled to the first or second terminals; and the conductive member 500 provided at each side part (end part in the second direction) of the panel unit 110 and extending in the up-down direction. The conductive member 500 extends from the light adjustment panel 1A positioned closest to the upper side (one side in the first direction) in the panel unit 110 to the light adjustment panel 1D positioned closest to the lower side (other side in the first direction) and couples the corresponding first terminal on the array substrate 2 and the corresponding second terminal on the counter substrate 3 in each light adjustment panel.

In Japanese Patent Application Laid-open Publication No. 2004-333567 as described above, one external coupling wire 400 is coupled to each of the terminals on an array substrate and on a counter substrate in each light adjustment panel, and accordingly, the number of external coupling wires 400 used in the entire light adjustment device increases. Specifically, eight external coupling wires 400 are needed in Japanese Patent Application Laid-open Publication No. 2004-333567.

However, in the present embodiment and the first and the second comparative examples, external coupling wires 400 such as flexible printed circuits are coupled only to four places in total, namely, the first terminals 210 and 220 on the array substrate 2 in the light adjustment panel 1D and the second terminals 330 and 340 on the counter substrate 3 in the light adjustment panel 1D as described above with reference to the table in FIG. 11.

Specifically, in a case of a light adjustment device in which four light adjustment panels are stacked, although eight external coupling wires 400 are needed in Japanese Patent Application Laid-open Publication No. 2004-333567, only four external coupling wires 400 are needed in the present embodiment and the first and the second comparative examples, and accordingly, the number of external coupling wires 400 is reduced. The four external coupling wires 400 can be disposed at the respective sides of the light adjustment device 100 in a rectangular shape and thus can be easily coupled as compared to a case where the four external coupling wires 400 are concentrated at one side.

The light adjustment panels 1, 1A, 1B, 1C, and 1D are each shaped like a polygon when viewed in the up-down direction, and the first terminals 210, 220, 230, and 240 and the second terminals 310, 320, 330, and 340 are strip-shaped bodies extending along the sides of the polygon. Accordingly, the wide terminals are disposed along the edges of the light adjustment panels 1, 1A, 1B, 1C, and 1D and thus can be easily coupled to the external coupling wire 400 such as a flexible printed circuit.

In the first and the second comparative examples, since the terminal 200 on each array substrate 2 is exposed from the corresponding counter substrate 3 when viewed from the Z1 side, the external coupling wire (flexible printed circuit) 400 can be more easily coupled to the terminal 200 than in the first embodiment. However, with the conductive members 510 and 520 according to the first and the second comparative examples, the distance between coupling parts of the conductive member 510 or 520 and substrates in the z direction is longer than in the first embodiment. For example, in the first comparative example, as illustrated in FIG. 13, the conductive member 510 is coupled to the array substrate 2 in the light adjustment panel 10A, the array substrate 2 in the light adjustment panel 10B, the array substrate 2 in the light adjustment panel 10C, and the array substrate 2 in the light adjustment panel 10D but not coupled to the counter substrates 3. Accordingly, the distance between coupling parts of the conductive member 510 and substrates in the Z direction is equal to the thickness of one light adjustment panel 10. Thus, control to apply the conductive paste of the conductive members 510 and 520 is difficult in the first and the second comparative examples.

However, in the first embodiment, each array substrate 2 on which the terminals 200 are positioned faces the corresponding counter substrate 3, and the conductive members 510 and 520 are coupled to the array substrates 2 and the counter substrates 3 in all light adjustment panels 10. Accordingly, the distance between coupling parts of the conductive member 510 or 520 and substrates in the Z direction is equal to the distance between the array substrate 2 and the counter substrate 3 in the Z direction. Thus, in the first embodiment, the side surfaces of the panel unit 110 where the conductive paste is applied are flattened as compared to the first and the second comparative examples, and control to apply the conductive paste of the conductive members 510 and 520 is easy.

Furthermore, in the first and the second comparative examples, since each array substrate 2 and the corresponding counter substrate 3 have different sizes and one of the substrates has a region not overlapping the other substrate in the Z direction, dicing cannot be performed in a state in which a plurality of wafers on which a plurality of array substrates 2 and counter substrates 3 are formed as described above with reference to FIGS. 3 and 4 are stacked, which leads to decrease in manufacturing efficiency and increase in manufacturing cost of the light adjustment device.

However, in the first embodiment, since the conductive paste of the conductive members 510 and 520 can be easily applied and the array substrates 2 and the counter substrates 3 on stacked wafers can be diced all at once, manufacturing efficiency can be improved, which is an advantage that cannot be obtained with the first and the second comparative examples. Moreover, in the first embodiment, since the array substrates 2 and the counter substrates 3 overlap each other in the Z direction without shift in the Y and X directions, the panel unit 110 has a narrow bezel, which contributes to size reduction and bezel width reduction of the light adjustment device 100.

Second Embodiment

Figure 16:
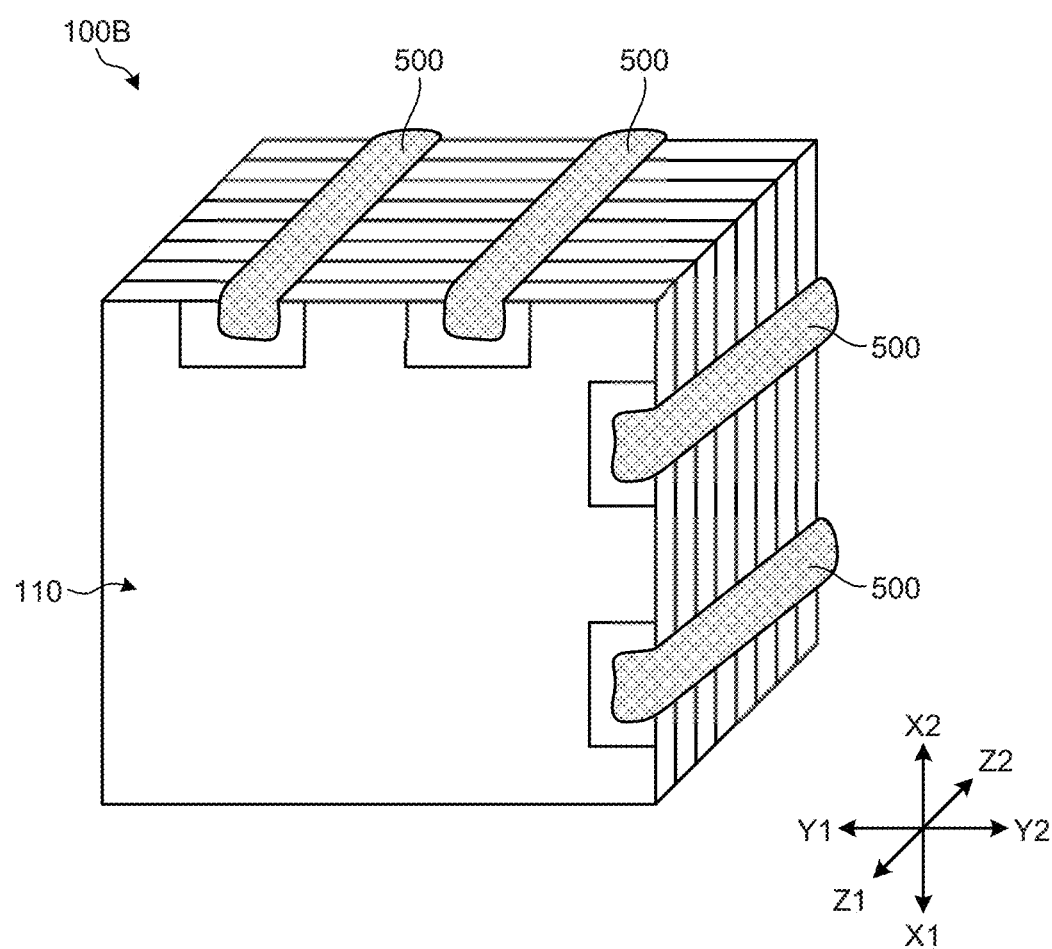
FIG. 16 is a perspective view schematically illustrating a light adjustment device according to a second embodiment.
Figure 17:
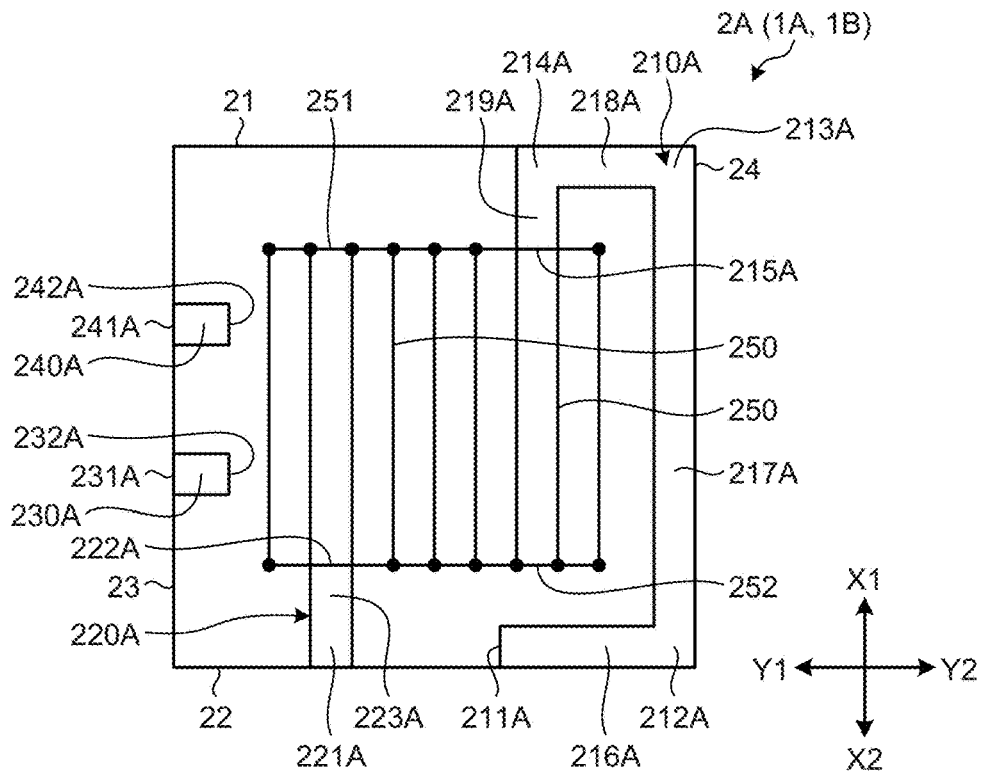
FIG. 17 is a plan view of an array substrate in each of the first and the second light adjustment panels from the top illustrated in FIG. 16.
Figure 18:
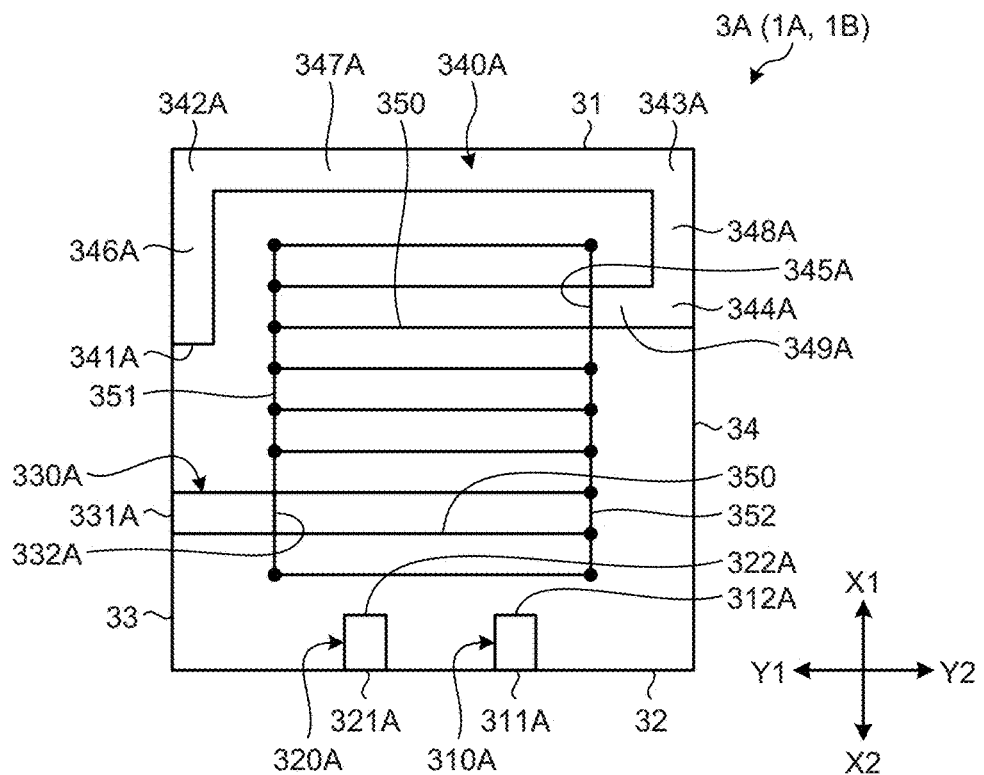
FIG. 18 is a plan view of a counter substrate in each of the first and the second light adjustment panels from the top illustrated in FIG. 16.
Figure 19:
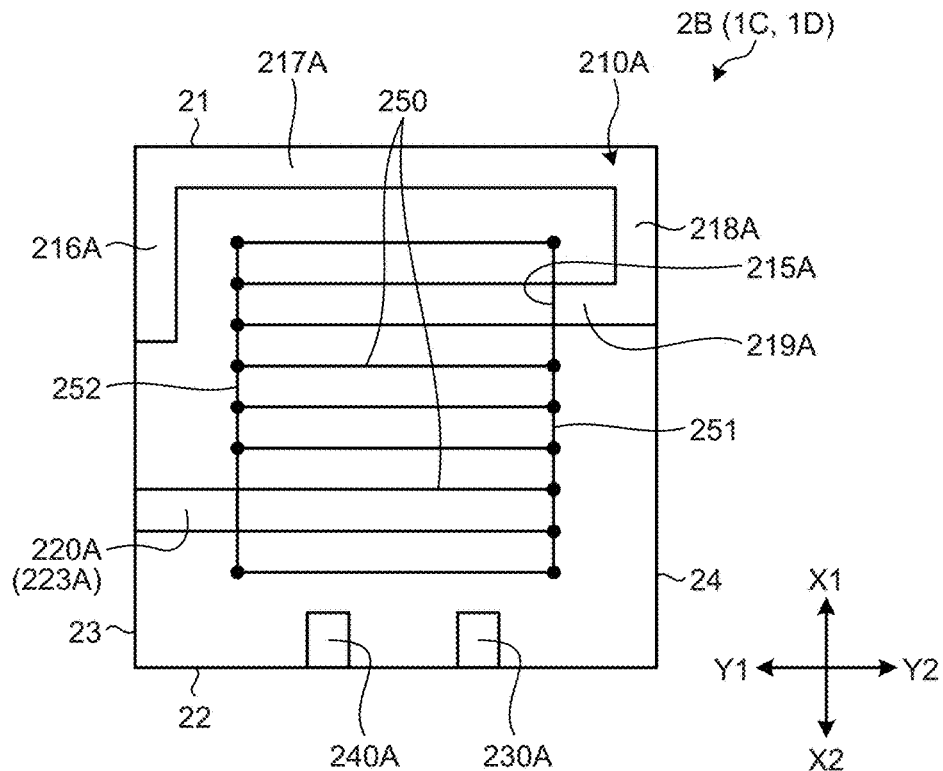
FIG. 19 is a plan view of an array substrate in each of the third and the fourth light adjustment panels from the top illustrated in FIG. 16.
Figure 20:
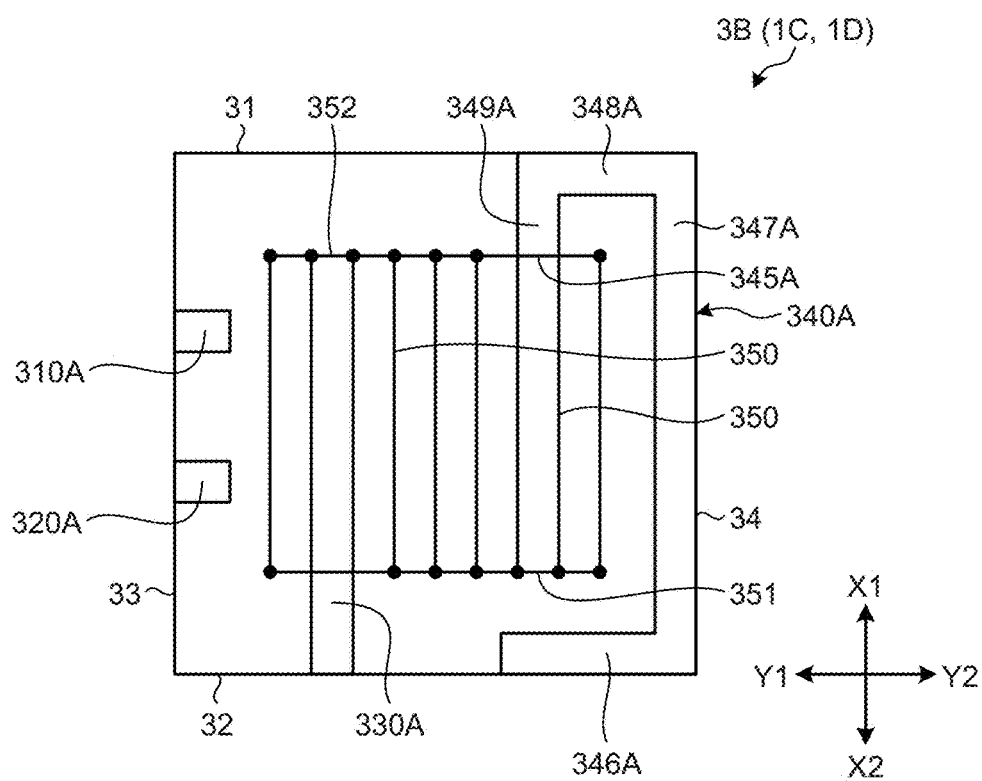
FIG. 20 is a plan view of a counter substrate in each of the third and the fourth light adjustment panels from the top illustrated in FIG. 16.

The following describes a second embodiment. FIG. 16 is a perspective view schematically illustrating a light adjustment device according to the second embodiment. FIG. 17 is a plan view of an array substrate in each of the first and the second light adjustment panels from the top illustrated in FIG. 16. FIG. 18 is a plan view of a counter substrate in each of the first and the second light adjustment panels from the top illustrated in FIG. 16. FIG. 19 is a plan view of an array substrate in each of the third and the fourth light adjustment panels from the top illustrated in FIG. 16. FIG. 20 is a plan view of a counter substrate in each of the third and the fourth light adjustment panels from the top illustrated in FIG. 16.

First, wires and terminals on array substrates and counter substrates included in the panel unit 110 will be described below in detail. As illustrated in FIG. 17, an array substrate 2A in each of the light adjustment panels 1A and 1B includes first terminals 210A, 220A, 230A, and 240A and the liquid crystal drive electrodes 250. The first side 21 is positioned on the X1 side. The second side 22 is positioned on the X2 side. The third side 23 is positioned on the Y1 side. The fourth side 24 is positioned on the Y2 side.

The first terminal 210A includes straight parts 216A, 217A, 218A, and 219A. The straight part 216A extends from an end 211A to an end 212A. The straight part 217A extends from the end 212A to an end 213A. The straight part 218A extends from the end 213A to an end 214A. The straight part 219A extends from the end 214A to an end 215A. The end 215A is coupled to the wire 251. The straight part 216A extends along the second side 22. The straight part 217A extends along the fourth side 24. The straight part 218A extends along the first side 21.

The first terminal 220A includes a straight part 223A. The straight part 223A extends from an end 221A to an end 222A in the X direction. The end 222A is coupled to the wire 252.

The first terminal 230A extends from an end 231A to an end 232A. The first terminal 240A extends from an end 241A to an end 242A. The first terminal 230A is disposed on the X2 side of the first terminal 240A. The first terminals 230A and 240A are provided at the third side 23. As illustrated in FIG. 18, a counter substrate 3A in each of the light adjustment panels 1A and 1B includes second terminals 310A, 320A, 330A, and 340A and the liquid crystal drive electrodes 350.

The second terminal 310A extends from an end 311A to an end 312A. The second terminal 320A extends from an end 321A to an end 322A. The second terminal 310A is disposed on the Y2 side of the second terminal 320A. The second terminals 310A and 320A are provided at the second side 32.

The second terminal 330A is provided at the third side 33. The second terminal 340A includes straight parts 346A, 347A, 348A, and 349A. The straight part 346A extends from an end 341A to an end 342A. The straight part 346A extends along the third side 33. The straight part 347A extends from the end 342A to an end 343A. The straight part 347A extends along the first side 31. The straight part 348A extends from the end 343A to an end 344A. The straight part 347A extends along the fourth side 34. The straight part 349A extends from the end 344A to an end 345A. The end 345A is coupled to the wire 352.

The light adjustment panels 1C and 1D will be described below. The positions of terminals, wires, and liquid crystal drive electrodes on an array substrate in each of the light adjustment panels 1C and 1D match the positions of terminals, wires, and liquid crystal drive electrodes on a counter substrate in each of the light adjustment panels 1A and 1B when viewed from above. In other words, the positions of terminals, wires, and liquid crystal drive electrodes are the same for an array substrate illustrated in FIG. 19 and a counter substrate illustrated in FIG. 18. In addition, the positions of terminals, wires, and liquid crystal drive electrodes are the same for a counter substrate illustrated in FIG. 20 and an array substrate illustrated in FIG. 17. Specific description is given below.

As illustrated in FIG. 19, an array substrate 2B in each of the light adjustment panels 1C and 1D includes the first terminals 210A, 220A, 230A, and 240A and the liquid crystal drive electrodes 250. The first side 21 is positioned on the X1 side. The second side 22 is positioned on the X2 side. The third side 23 is positioned on the Y1 side. The fourth side 24 is positioned on the Y2 side.

The first terminal 210A includes the straight parts 216A, 217A, 218A, and 219A. The straight part 216A extends along the third side 23. The straight part 217A extends along the first side 21. The straight part 218A extends along the fourth side 24. The first terminal 210A is coupled to the wire 251.

The first terminal 220A includes the straight part 223A. The straight part 223A is provided at the third side 23. The straight part 223A is coupled to the wire 252.

The first terminals 230A and 240A are provided at the second side 22. The first terminal 230A is disposed on the Y2 side of the first terminal 240A.

As illustrated in FIG. 20, a counter substrate 3B in each of the light adjustment panels 1C and 1D includes the second terminals 310A, 320A, 330A, and 340A and the liquid crystal drive electrodes 350.

The second terminals 310A and 320A are provided at the third side 33. The second terminal 310A is positioned on the X1 side of the second terminal 320A.

The second terminal 330A is provided at the second side 32.

The second terminal 340A includes the straight parts 346A, 347A, 348A, and 349A. The straight part 346A extends along the second side 32. The straight part 347A extends along the fourth side 34. The straight part 348A extends along the first side 31. The end 345A of the straight part 349A is coupled to the wire 352.

As described above, according to the second embodiment as well, in a case of a light adjustment device in which four light adjustment panels are stacked, although eight external coupling wires 400 are needed in Japanese Patent Application Laid-open Publication No. 2004-333567, only four external coupling wires 400 are needed in the present embodiment, and accordingly, the number of external coupling wires 400 is reduced as in the first embodiment.

Moreover, the straight part 217A of the first terminal 210A and the straight part 347A of the second terminal 340A each extend across the entire range of a side, and accordingly, the external coupling wire 400 is coupled in a longer range.

Third Embodiment

Figure 21:
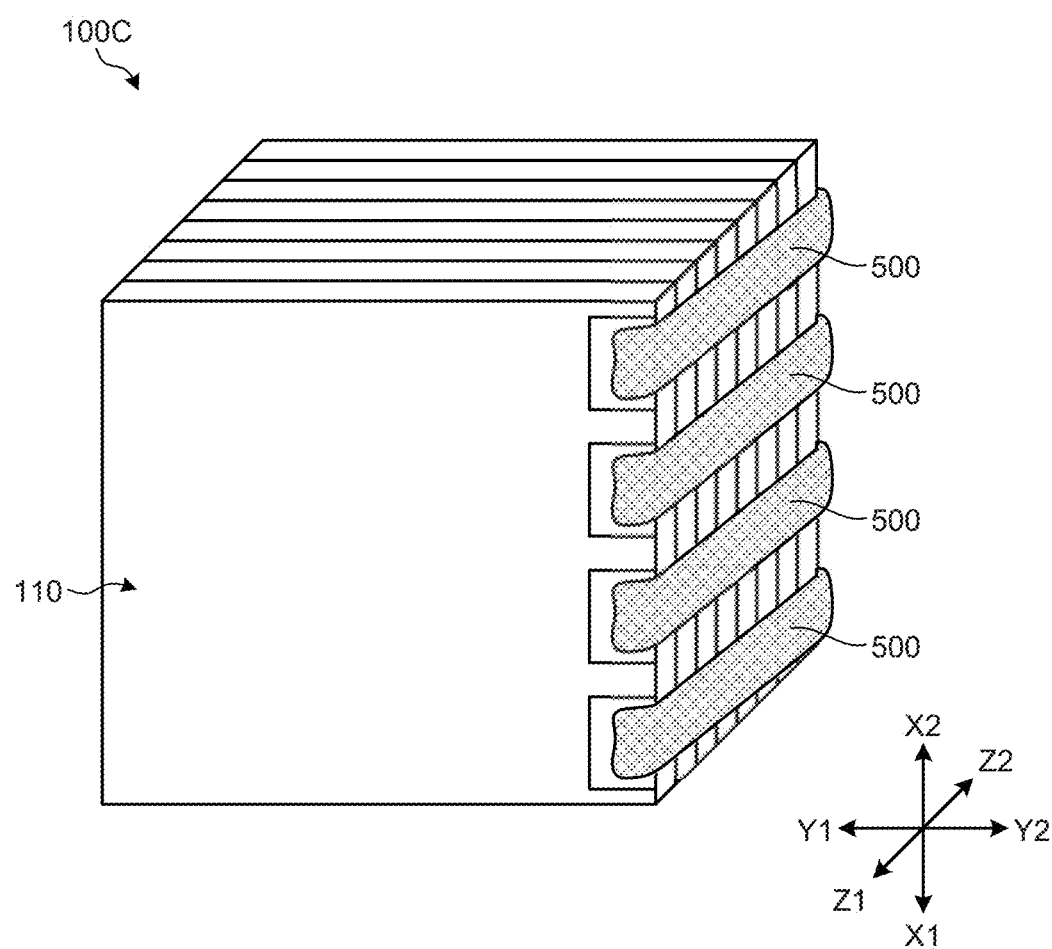
FIG. 21 is a perspective view schematically illustrating a light adjustment device according to a third embodiment.
Figure 22:
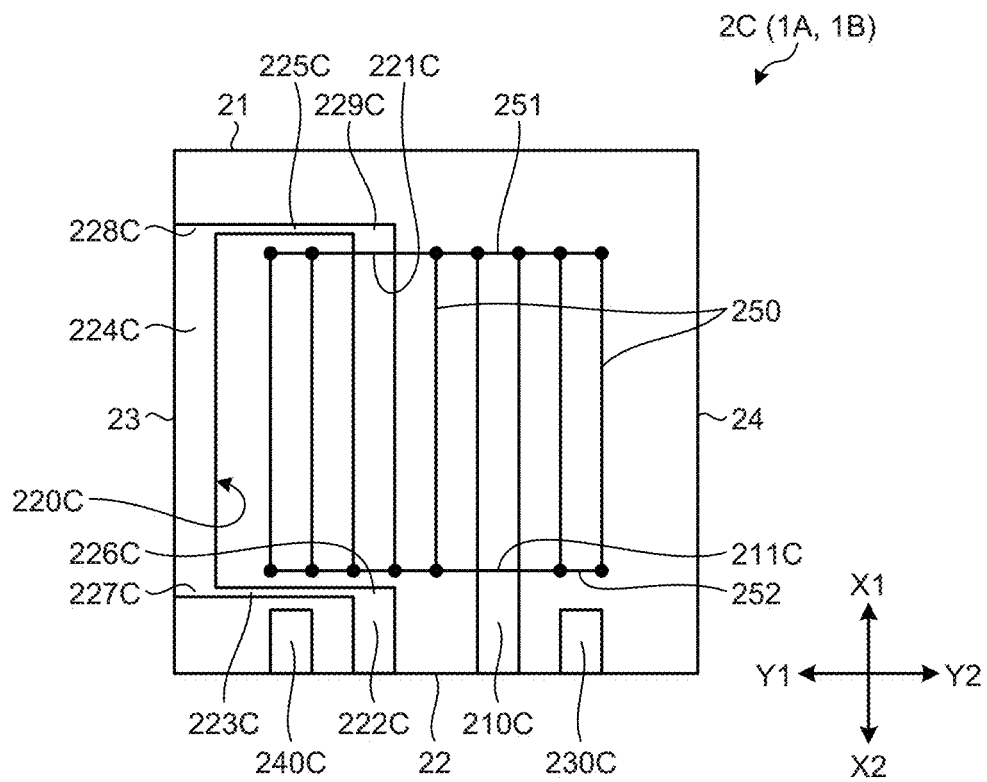
FIG. 22 is a plan view of an array substrate in each of the first and the second light adjustment panels from the top illustrated in FIG. 21.
Figure 23:
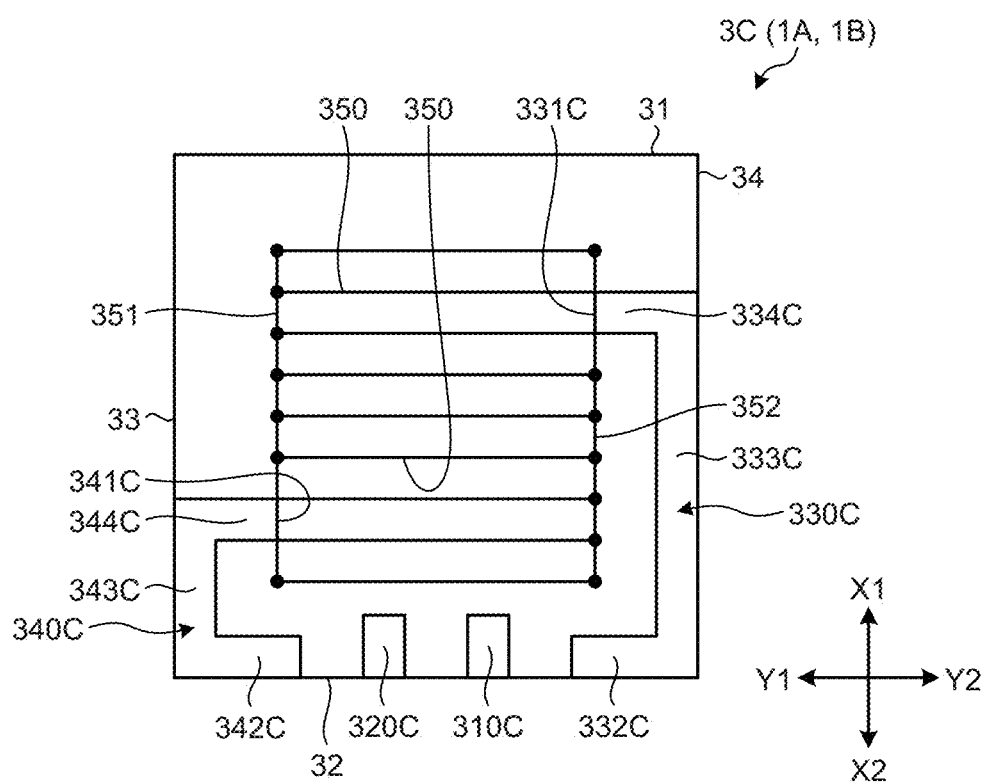
FIG. 23 is a plan view of a counter substrate in each of the first and the second light adjustment panels from the top illustrated in FIG. 21.
Figure 24:
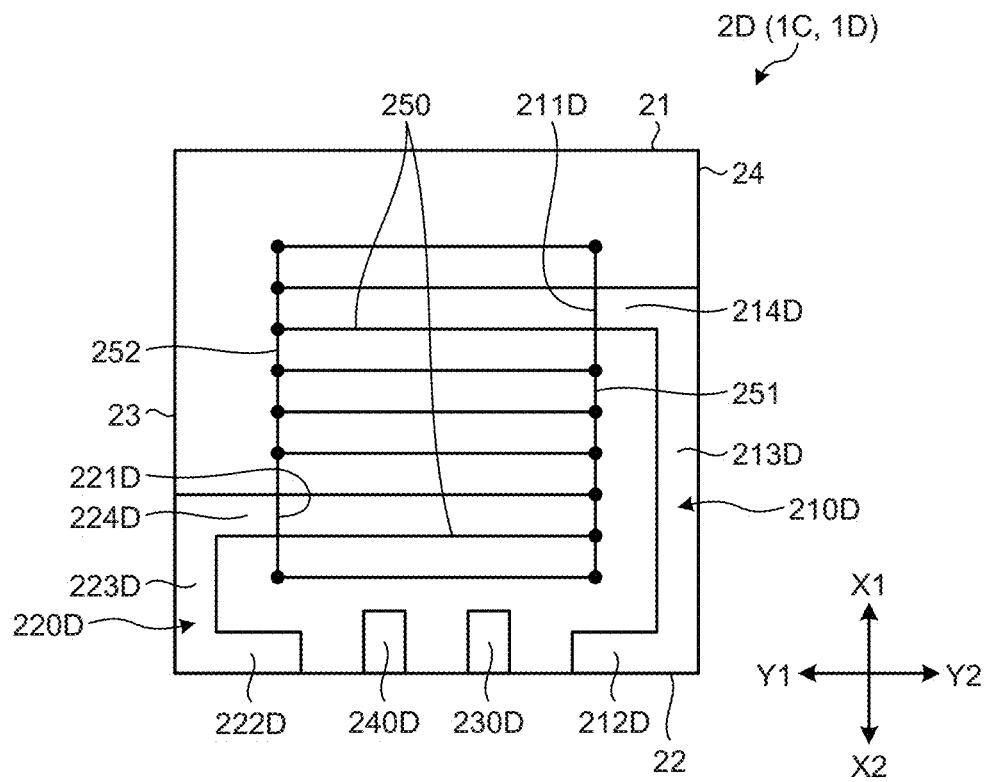
FIG. 24 is a plan view of an array substrate in each of the third and the fourth light adjustment panels from the top illustrated in FIG. 21.
Figure 25:
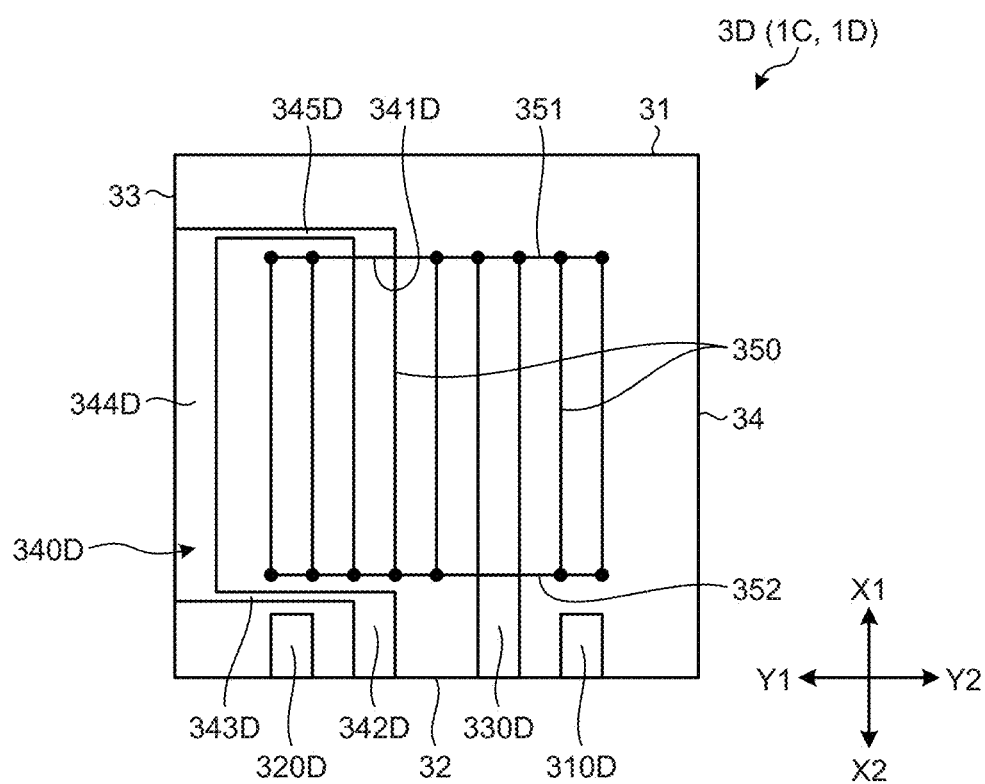
FIG. 25 is a plan view of a counter substrate in each of the third and the fourth light adjustment panels from the top illustrated in FIG. 21.

The following describes a third embodiment. FIG. 21 is a perspective view schematically illustrating a light adjustment device according to the third embodiment. FIG. 22 is a plan view of an array substrate in each of the first and the second light adjustment panels from the top illustrated in FIG. 21. FIG. 23 is a plan view of a counter substrate in each of the first and the second light adjustment panels from the top illustrated in FIG. 21. FIG. 24 is a plan view of an array substrate in each of the third and the fourth light adjustment panels from the top illustrated in FIG. 21. FIG. 25 is a plan view of a counter substrate in each of the third and the fourth light adjustment panels from the top illustrated in FIG. 21.

First, wires and terminals on array substrates and counter substrates included in the panel unit 110 in a light adjustment device 100C according to the third embodiment will be described below in detail. In the third embodiment, four terminals are disposed at the same second side in each light adjustment panel. Specific description is given below.

As illustrated in FIG. 22, an array substrate 2C in each of the light adjustment panels 1A and 1B includes first terminals 210C, 220C, 230C, and 240C and the liquid crystal drive electrodes 250. The first side 21 is positioned on the X1 side. The second side 22 is positioned on the X2 side. The third side 23 is positioned on the Y1 side. The fourth side 24 is positioned on the Y2 side.

The first terminal 210C is provided at the second side 32. An end 211C of the first terminal 210C is coupled to the wire 252. The first terminal 220C includes straight parts 222C, 223C, 224C, and 225C. The straight part 222C extends from the second side 22 to an end 226C. The straight part 223C extends from the end 226C to an end 227C. The straight part 224C extends from the end 227C to an end 228C. The straight part 225C extends from the end 228C to an end 229C. The end 229C is coupled to the wire 251.

The first terminal 230C is provided at the second side 22. The first terminal 230C is positioned on the Y2 side of the first terminal 210C.

The first terminal 240C is provided at the second side 22. The first terminal 240C is positioned on the Y1 side of the straight part 222C.

At the second side 22 of the array substrate 2C, the first terminal 230C, the first terminal 210C, the straight part 222C of the first terminal 220C, and the first terminal 240C are arranged in order from the Y2 side toward the Y1 side.

As illustrated in FIG. 23, a counter substrate 3C in each of the light adjustment panels 1A and 1B includes second terminals 310C, 320C, 330C, and 340C and the liquid crystal drive electrodes 350.

The second terminals 310C and 320C are provided at the second side 32. The second terminal 310C is disposed on the Y2 side of the second terminal 320C.

The second terminal 330C includes straight parts 332C, 333C, and 334C. The straight part 332C extends along the second side 32. The straight part 333C extends along the fourth side 34. The straight part 334C has an end 331C, and the end 331C is coupled to the wire 352.

The second terminal 340C includes straight parts 342C, 343C, and 344C. The straight part 342C extends along the second side 32. The straight part 343C extends along the third side 33. The straight part 344C has an end 341C, and the end 341C is coupled to the wire 351.

The light adjustment panels 1C and 1D will be described below. The positions of terminals, wires, and liquid crystal drive electrodes on an array substrate in each of the light adjustment panels 1C and 1D match the positions of terminals, wires, and liquid crystal drive electrodes on a counter substrate in each of the light adjustment panels 1A and 1B when viewed from above. In other words, the positions of terminals, wires, and liquid crystal drive electrodes are the same for an array substrate illustrated in FIG. 24 and a counter substrate illustrated in FIG. 23. In addition, the positions of terminals, wires, and liquid crystal drive electrodes are the same for a counter substrate illustrated in FIG. 25 and an array substrate illustrated in FIG. 22. Specific description is given below.

As illustrated in FIG. 24, an array substrate 2D in each of the light adjustment panels 1C and 1D includes first terminals 210D, 220D, 230D, and 240D and the liquid crystal drive electrode 250. The first side 21 is positioned on the X1 side. The second side 22 is positioned on the X2 side. The third side 23 is positioned on the Y1 side. The fourth side 24 is positioned on the Y2 side.

The first terminal 210D includes straight parts 212D, 213D, and 214D. The straight part 212D extends along the second side 22. The straight part 213D extends along the fourth side 24. The straight part 214D has an end 211D, and the end 211D is coupled to the wire 251.

The first terminal 220D includes straight parts 222D, 223D, and 224D. The straight part 222D extends along the second side 22. The straight part 223D extends along the third side 23. The straight part 224D has an end 221D, and the end 221D is coupled to the wire 252.

The first terminals 230D and 240D are provided at the second side 22. The first terminal 230D is positioned on the Y2 side of the first terminal 240D.

As illustrated in FIG. 25, a counter substrate 3D in each of the light adjustment panels 1C and 1D includes second terminals 310D, 320D, 330D, and 340D and the liquid crystal drive electrodes 350.

The second terminals 310D and 320D are provided at the second side 32. The second terminal 310D is positioned on the Y2 side of the second terminal 320D.

The second terminal 330D is provided at the second side 32. The second terminal 330D is coupled to the wire 352.

The second terminal 340D includes straight parts 342D, 343D, 344D, and 345D. The straight part 342D is provided at the second side 32. The straight part 343D extends from a distal end of the straight part 342D toward the Y1 side. The straight part 344D extends along the third side 33. The straight part 345D extends in the Y direction and has an end 341D coupled to the wire 351.

As described above, according to the third embodiment as well, the number of external coupling wires 400 such as flexible printed circuits can be reduced as in the first and the second embodiments. In particular, since all terminals are disposed at one side, in the third embodiment, four external coupling wires 400 are pulled out in the same direction and can be coupled to one external connector.

First Modification

Figure 26:
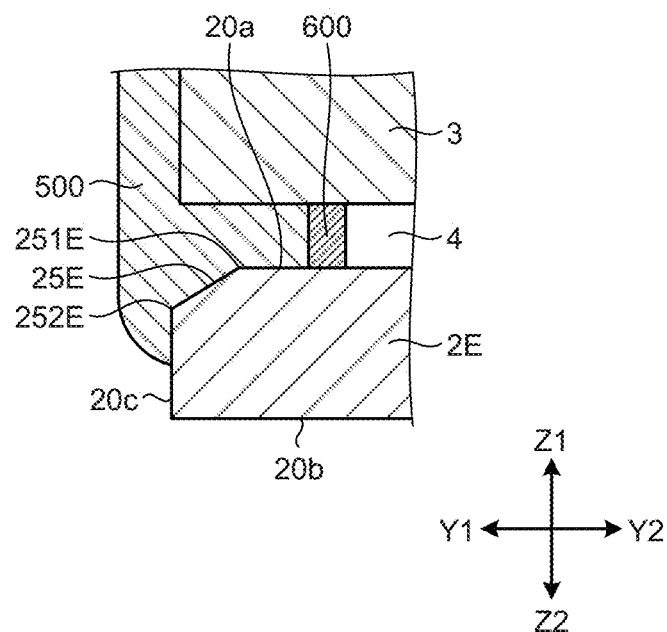
FIG. 26 is a schematic sectional view illustrating a light adjustment device according to a first modification.

The following describes a first modification. FIG. 26 is a schematic sectional view illustrating a light adjustment device according to the first modification.

As illustrated in FIG. 26, in the first modification, a chamfered part 25E is provided at an end part of an array substrate 2E. The chamfered part 25E is provided at a corner of a front surface 20a and a side surface 20c. The chamfered part 25E is illustrated with, for example, a tilt surface in a sectional view. The tilt surface is tilted downward toward the corresponding conductive member 500. In other words, the chamfered part 25E is formed in a shape with which the vertical distance between the array substrate 2E and the corresponding counter substrate 3 increases toward the Y1 side. The chamfered part 25E is, for example, a flat surface connecting an end 251E of the front surface (upper surface) 20a of the array substrate 2E and an end 252E of the side surface 20c of the array substrate 2E.

As described above, in the first modification, since the chamfered part 25E where the vertical distance (distance in the Z direction) increases toward the Y1 side is provided, for example, the corresponding conductive member 500 can be easily shaped because conductive paste flows in from the chamfered part 25E when the paste is applied to form the conductive member 500.

Second Modification

Figure 27:
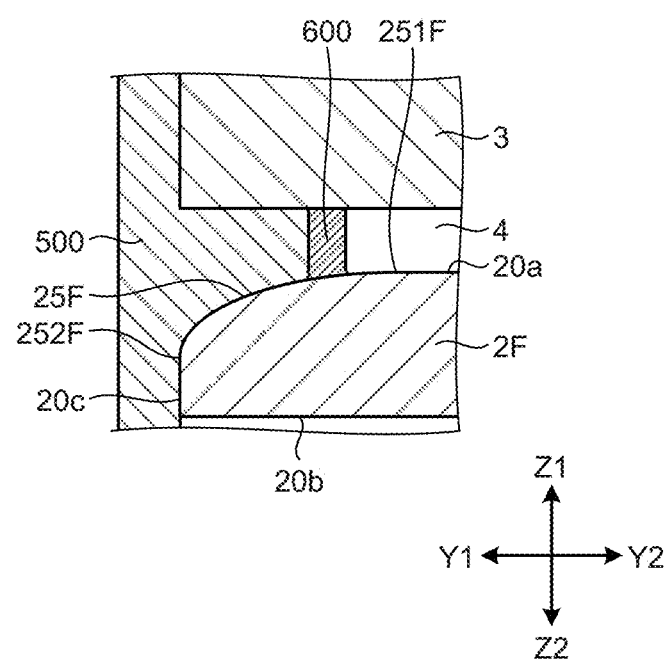
FIG. 27 is a schematic sectional view illustrating a light adjustment device according to a second modification.

The following describes a second modification. FIG. 27 is a schematic sectional view illustrating a light adjustment device according to the second modification.

As illustrated in FIG. 27, in the second modification, a curved surface part 25F is provided at an end part of an array substrate 2F. The curved surface part 25F is provided at the corner of the front surface 20a and the side surface 20c. The curved surface part 25F is formed in a shape with which the vertical distance between the array substrate 2E and the corresponding counter substrate 3 increases toward the Y1 side. The curved surface part 25F is curved in a convex shape toward the counter substrate 3.

As described above, in the second modification, since the curved surface part 25F curved in a convex shape is provided, for example, the corresponding conductive member 500 can be easily shaped because conductive paste flows in from the curved surface part 25F when the paste is applied to form the conductive member 500.

Third Modification

Figure 28:
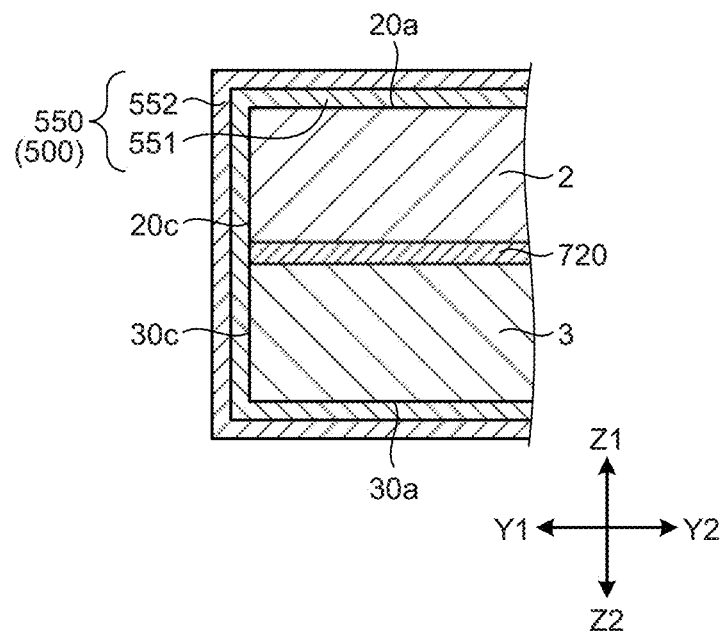
FIG. 28 is a schematic sectional view illustrating a light adjustment device according to a third modification.

The following describes a third modification. FIG. 28 is a schematic sectional view illustrating a light adjustment device according to the third modification.

As illustrated in FIG. 28, in the third modification, each conductive member is provided in a two-layer structure. Although each conductive member 500 described above in the embodiments has a one-layer structure, each conductive member 550 according to the third modification has a two-layer structure of a first layer 551 and a second layer 552 formed thereon. Specifically, low-viscosity paste is applied as the first layer 551, and then high-viscosity paste is applied as the second layer 552 on the first layer 551, and thereafter, the pastes are cured to form the conductive member 550. The low-viscosity paste is preferably, for example, silver (Ag) paste, and the high-viscosity paste is preferably, for example, carbon (C) paste.

As described above, in the third modification, each conductive member 500 includes the first layer 551 containing silver and the second layer 552 stacked on the first layer 551 and containing carbon.

Each conductive member 500 is formed by applying and drying paste containing conductive material, for example. Low-viscosity paste has a higher shrinkage rate than high-viscosity paste. If high-viscosity paste is applied as the first layer and then high-viscosity paste is applied as the second layer and the entire paste is allowed to dry, the second layer is prone to cracks or the like. Thus, it is preferable to form each conductive member 500 by applying paste of silver with low viscosity as the first layer and then applying, as the second layer, paste of carbon with higher viscosity than silver.

Fourth Modification

Figure 29:
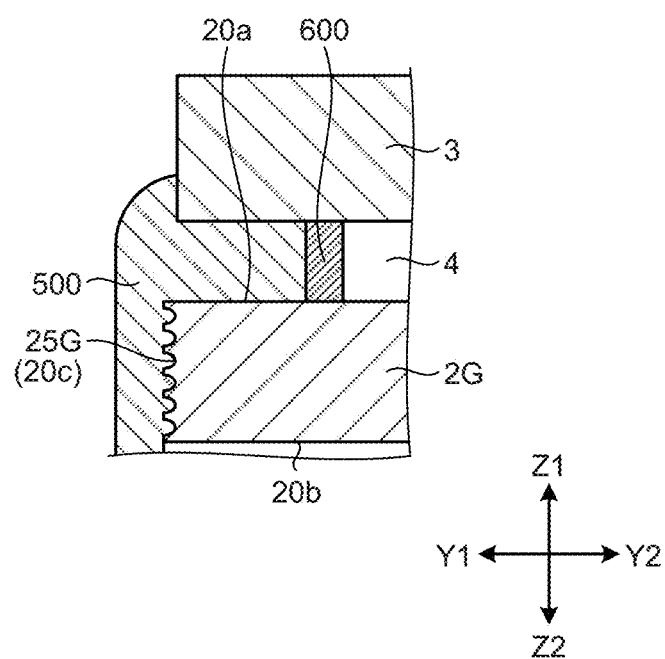
FIG. 29 is a schematic sectional view illustrating a light adjustment device according to a fourth modification.

The following describes a fourth modification. FIG. 29 is a schematic sectional view illustrating a light adjustment device according to the fourth modification.

As illustrated in FIG. 29, in the fourth modification, an uneven part 25G is provided at the side surface 20c of an array substrate 2G. In other words, the uneven part 25G consists of grooves. Specifically, uneven parts are alternately arranged in the up-down direction at the side surface 20c of the array substrate 2G.

As described above, in the fourth modification, the uneven part 25G is provided at the side surface 20c of the array substrate 2G. In a case where the corresponding conductive member 500 is formed by applying and drying paste containing conductive material, for example, the paste enters the grooves of the uneven part 25G and is cured. Accordingly, the conductive member 500 is solidly fixed by the array substrate 2G.

Fifth Modification

Figure 30:
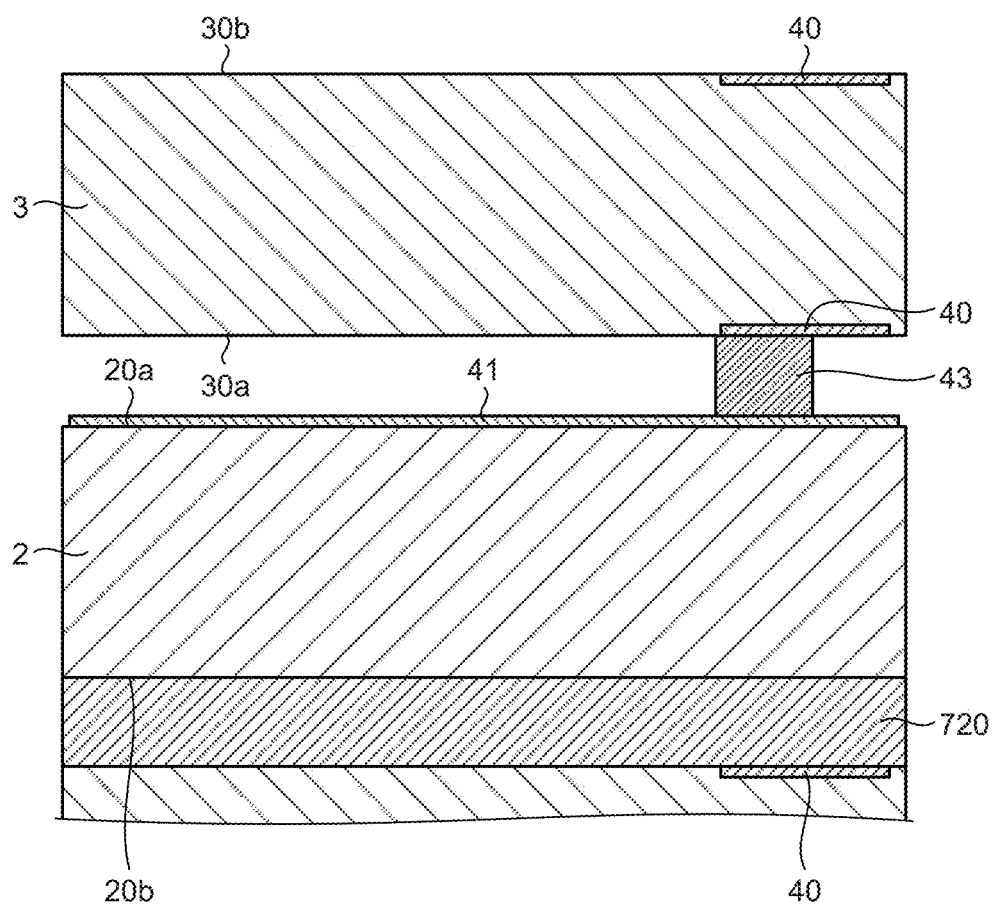
FIG. 30 is a schematic sectional view illustrating a light adjustment panel in which an array substrate and a counter substrate are coupled to each other through a conduction body in a light adjustment device according to a fifth modification.
Figure 30:
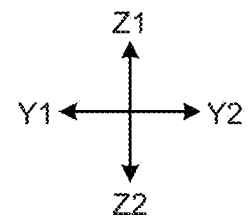
Figure 31:
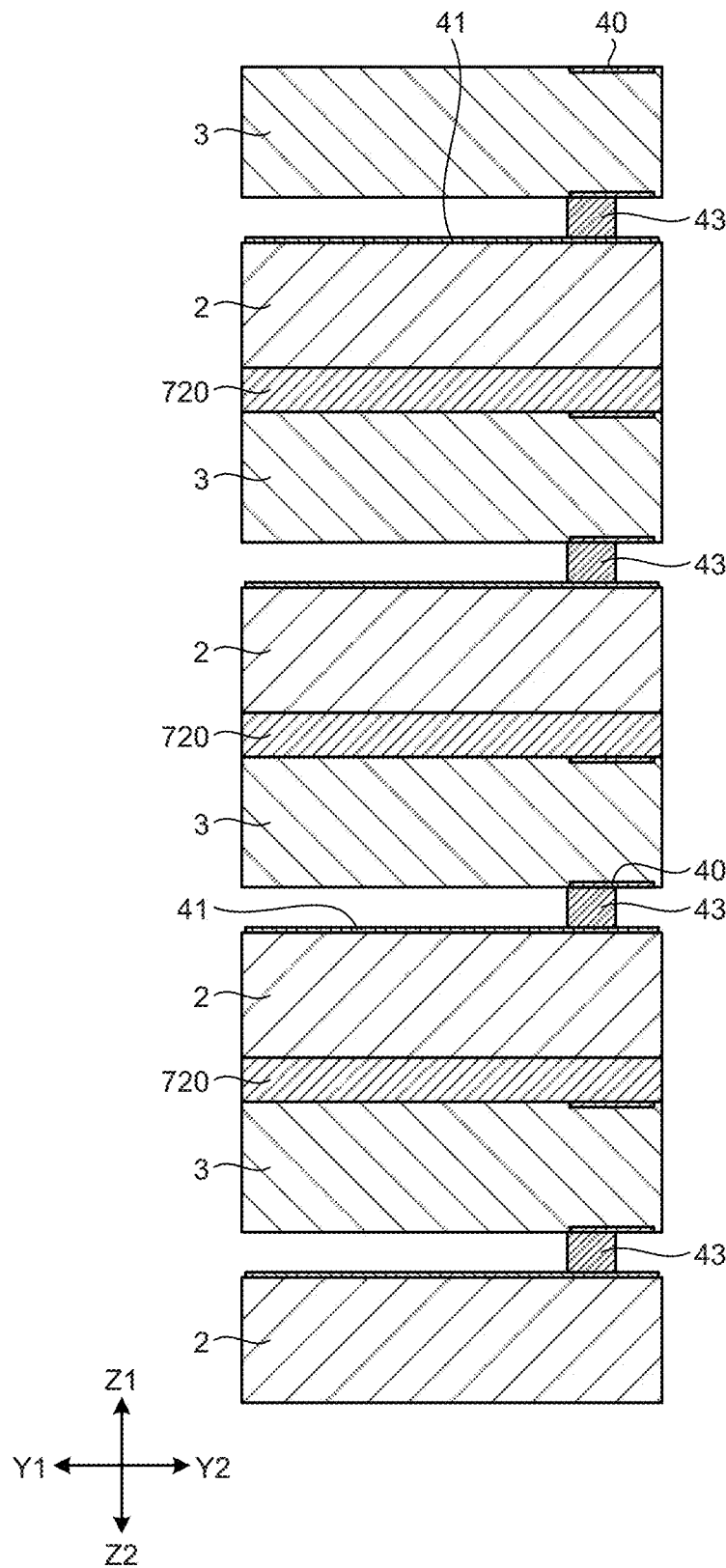
FIG. 31 is a schematic diagram illustrating a panel unit in which the light adjustment panels in FIG. 30 are stacked.
Figure 32:
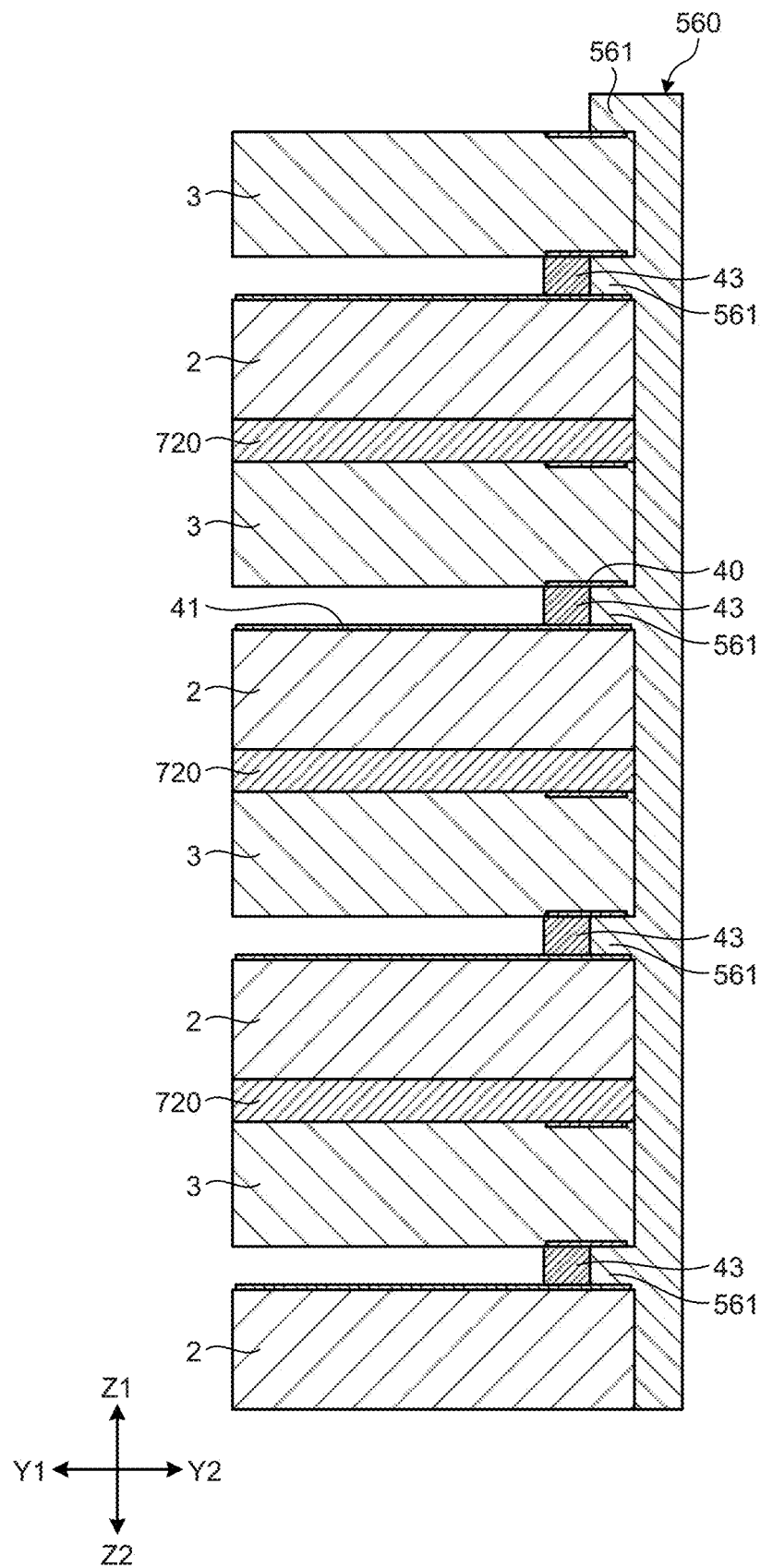
FIG. 32 is a schematic diagram of the panel unit in FIG. 31 provided with a conductive member at a side part.

The following describes a fifth modification. FIG. 30 is a schematic sectional view illustrating a light adjustment panel in which an array substrate and a counter substrate are coupled to each other through a conduction body in a light adjustment device according to the fifth modification. FIG. 31 is a schematic diagram illustrating a panel unit in which the light adjustment panels in FIG. 30 are stacked. FIG. 32 is a schematic diagram of the panel unit in FIG. 31 provided with a conductive member at a side part.

In the fifth modification, each array substrate 2 and the corresponding counter substrate 3 are vertically electrically coupled to each other through a conduction body 43, and a conductive member 560 is electrically coupled to the conduction body 43. Specific description is given below.

First, as illustrated in FIG. 30, an electrode 41 is formed on the front surface 20a of each array substrate 2. The electrode 41 extends, for example, across the entire length in the Y direction and is coupled to, for example, the liquid crystal drive electrodes 250. In addition, electrodes 40 are formed at end parts of a front surface 3a and a back surface 3b of the corresponding counter substrate 3. Thereafter, as illustrated in FIG. 31, the conduction body 43 extending in the up-down direction is provided to couple one of the electrodes 40 to the electrode 41.

Then, as illustrated in FIG. 32, the conductive member 560 is provided at a side part of the panel unit 110. In the conductive member 560, a plurality of protrusion parts 561 protruding to a side (in the Y direction) are vertically provided at intervals. A distal end of each protrusion part 561 is electrically coupled to the corresponding conduction body 43.

As described above, in the fifth modification, the first terminal 210 on each array substrate 2 and the second terminal 310 on the corresponding counter substrate 3 are coupled to each other through the conduction body 43, and the conductive member 500 is coupled to the conduction body 43. Since the first terminal 210 on the array substrate 2 and the second terminal 310 on the counter substrate 3 are coupled to each other through both the conduction body 43 and the conductive member 500, conduction improves.

Sixth Modification

Figure 33:
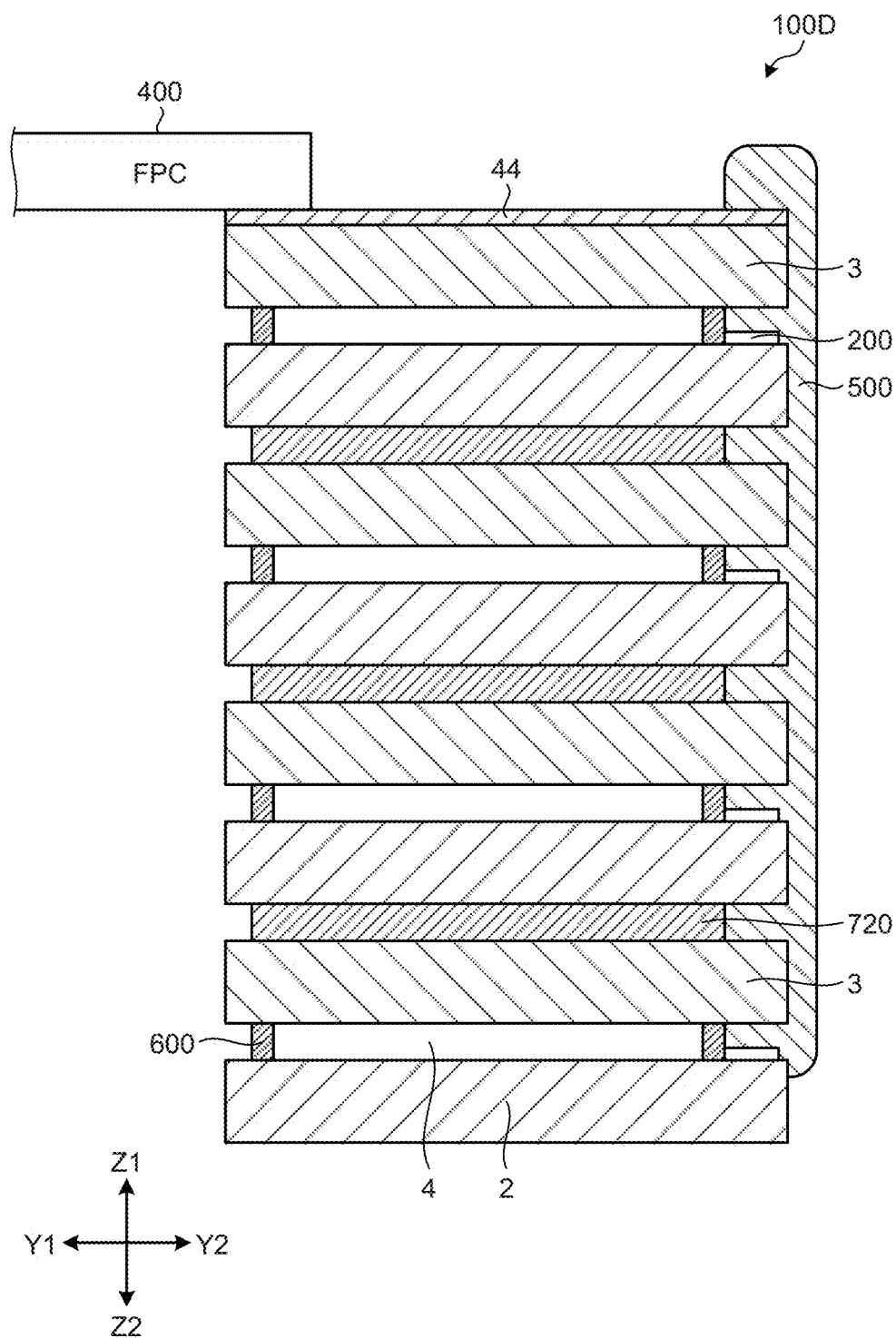
FIG. 33 is a schematic sectional view illustrating a light adjustment device according to a sixth modification.

The following describes a sixth modification. FIG. 33 is a schematic sectional view illustrating a light adjustment device according to the sixth modification.

In the sixth modification, the panel unit 110 is provided with an ITO film coupled to a conductive member 500, and the external coupling wire 400 such as a flexible printed circuit is coupled to the ITO film. Specific description is given below.

As illustrated in FIG. 33, in a light adjustment device 100D, an ITO film 44 is provided on the upper surface (back surface 30b) of the counter substrate 3 disposed closest to the upper side in the panel unit 110. The ITO film 44 is formed substantially across the entire length in the Y direction. The external coupling wire 400 is coupled to an end part of the ITO film 44 on the Y1 side. The ITO film 44 is an example of a translucent conductive film.

As described above, in the sixth modification, the ITO film 44 coupled to the conductive member 500 is formed on the upper surface of the counter substrate 3. The ITO film 44 is coupled to the external coupling wire 400.

In the above-described embodiments and modifications, the external coupling wire 400 is coupled to a terminal 200. However, in the present modification, the external coupling wire 400 is coupled to the terminal 200 through the conductive member 500 and the ITO film 44, and thus can be coupled to a site where no terminal is provided like the upper surface of the counter substrate 3.

Seventh Modification

Figure 34:
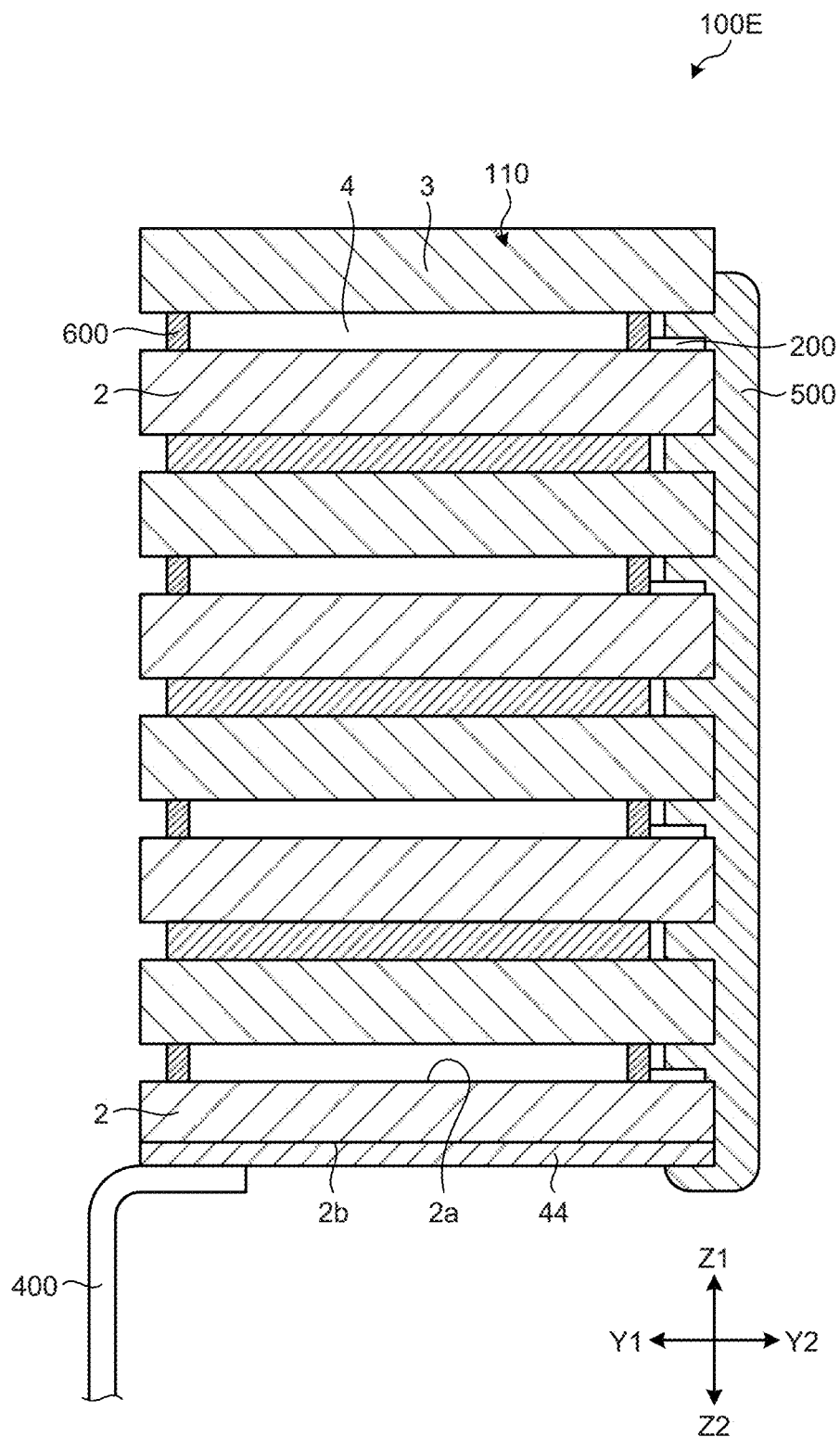
FIG. 34 is a schematic sectional view illustrating a light adjustment device according to a seventh modification.

The following describes a seventh modification. FIG. 34 is a schematic sectional view illustrating a light adjustment device according to the seventh modification. In the seventh modification, the ITO film 44 is formed on the counter substrate 3 disposed closest to the upper side in the panel unit 110 and is coupled to the external coupling wire 400 such as a flexible printed circuit. However, in the seventh modification, the ITO film 44 is formed on the array substrate 2 disposed closest to the lower side in the panel unit 110 and is coupled to the external coupling wire 400. Specific description is given below.

As illustrated in FIG. 34, in a light adjustment device 100E, the ITO film 44 is provided on the lower surface (back surface 20b) of the array substrate 2 disposed closest to the lower side in the panel unit 110. The ITO film 44 is formed substantially across the entire length in the Y direction. The external coupling wire 400 is coupled below the end part of the ITO film 44 on the Y1 side.

As described above, in the seventh modification, the ITO film 44 coupled to a conductive member 500 is formed on a lower surface 2b (surface on the other side in the first direction) of the array substrate 2 and coupled to the external coupling wire 400.

In the above-described embodiments and modifications, the external coupling wire 400 is coupled to a terminal 200. However, in the present modification, the external coupling wire 400 is coupled to the terminal 200 through the conductive member 500 and the ITO film 44, and thus can be coupled to a site where no terminal is provided like the lower surface 2b of the array substrate 2.

Eighth Modification

Figure 35:
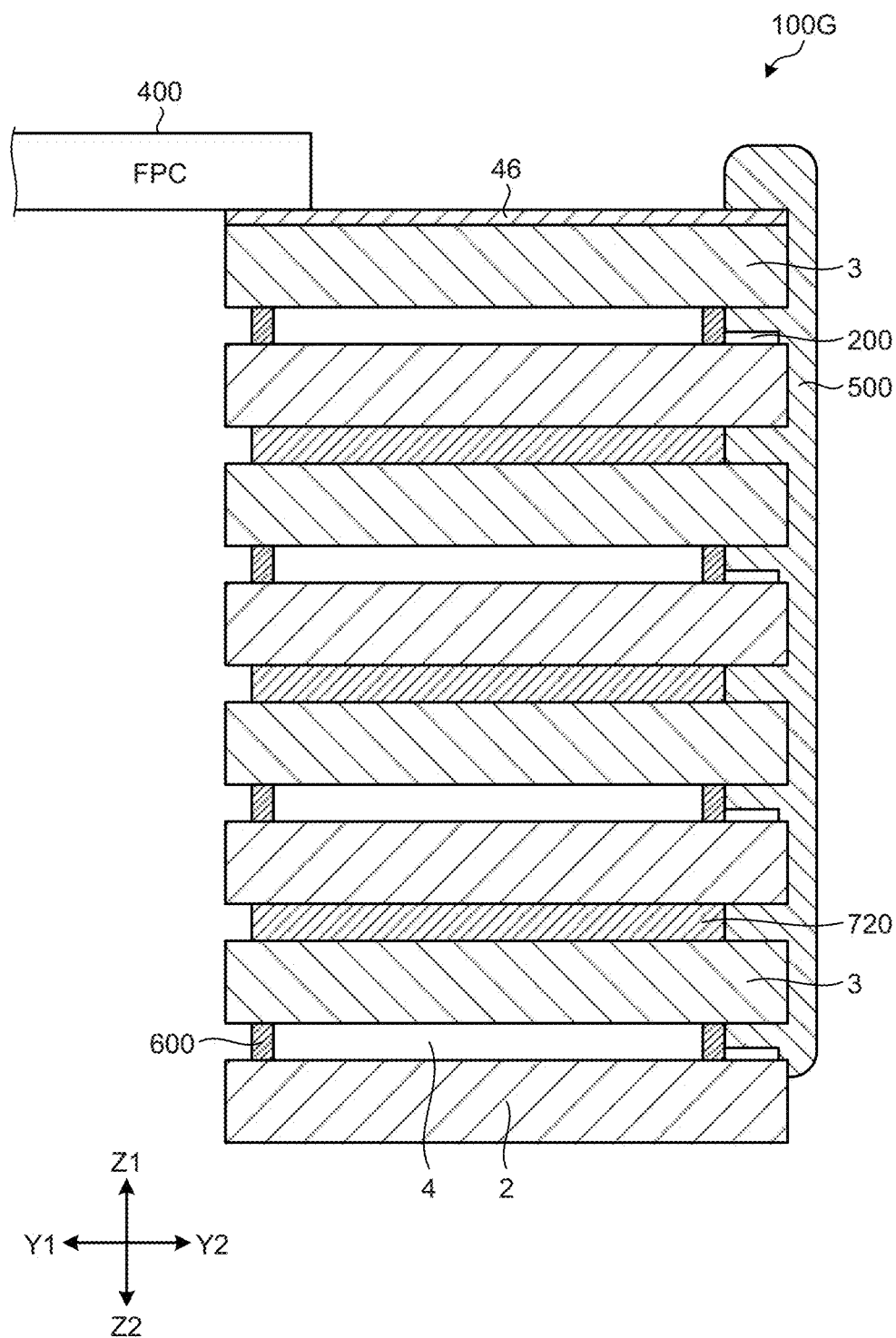
FIG. 35 is a schematic sectional view illustrating a light adjustment device according to an eighth modification.
Figure 36:
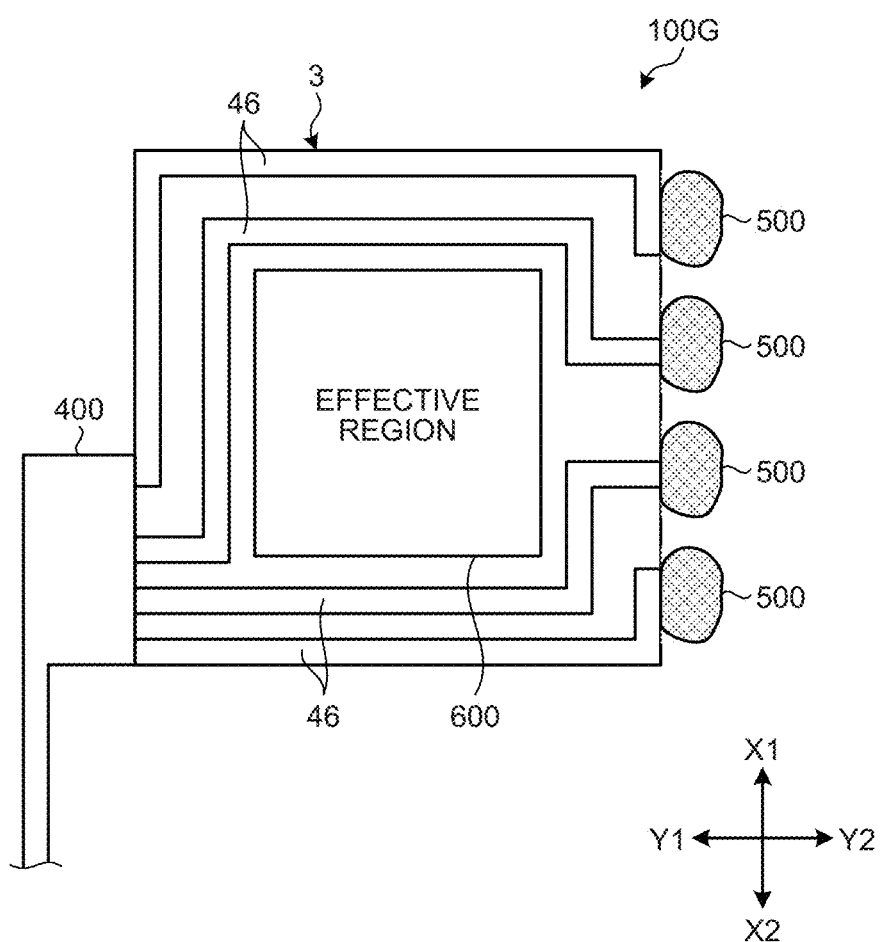
FIG. 36 is a schematic plan view illustrating the light adjustment device in FIG. 35.

FIG. 35 is a schematic sectional view illustrating a light adjustment device according to an eighth modification. FIG. 36 is a schematic plan view illustrating the light adjustment device in FIG. 35.

In the sixth modification, the ITO film 44 is formed on the counter substrate 3 disposed closest to the upper side in the panel unit 110 and is coupled to the external coupling wire 400 such as a flexible printed circuit. However, in the eighth modification, metal wires 46 are provided on the counter substrate 3 disposed closest to the upper side in the panel unit 110 and are coupled to the external coupling wire 400. Specific description is given below.

As illustrated in FIG. 35, in a light adjustment device 100G, the metal wires 46 are provided on the upper surface (back surface 30b) of the counter substrate 3 disposed closest to the upper side in the panel unit 110. The metal wires 46 are opaque. As illustrated in FIG. 36, the inside of the seal 600 is the effective region. The metal wires 46 are provided around the outside of the seal 600. Each of the four conductive members 500 is coupled to the external coupling wire 400.

As described above, in the eighth modification, since the metal wires 46 are provided on the upper surface (back surface 30b) of the counter substrate 3 and coupled to the external coupling wire 400, the external coupling wire 400 can be coupled to a site where no terminal is provided like the upper surface of the counter substrate 3.

Ninth Modification

Figure 37:
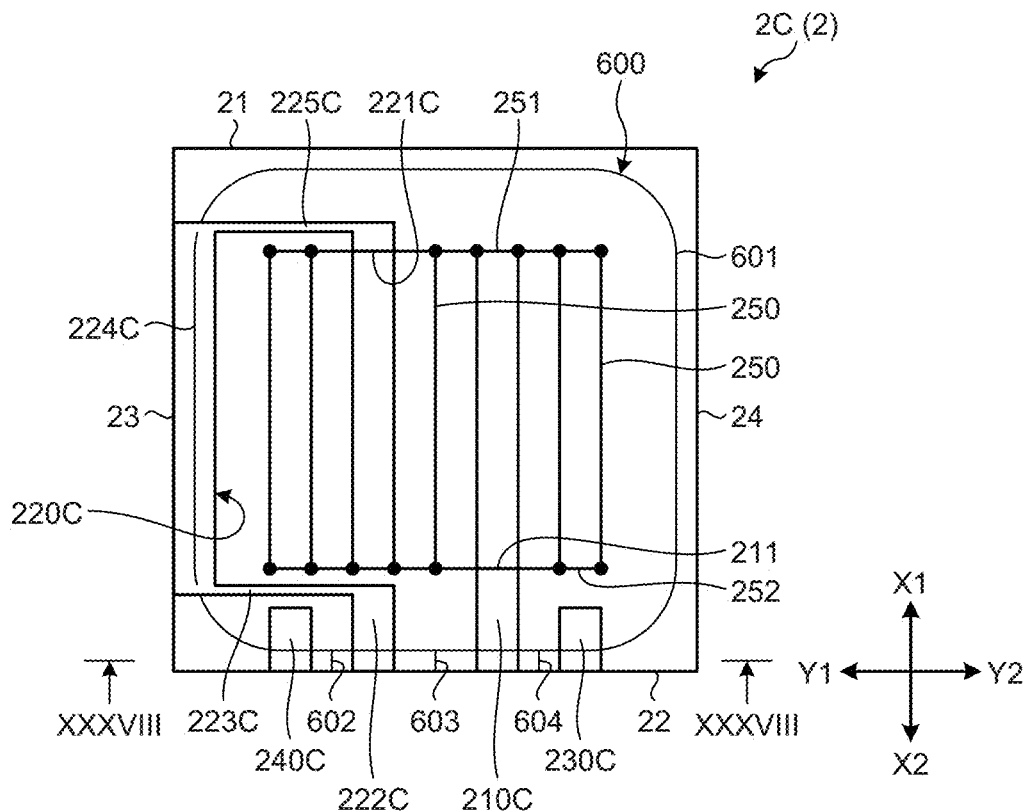
FIG. 37 is a plan view of an array substrate in a light adjustment device according to a ninth modification.
Figure 38:
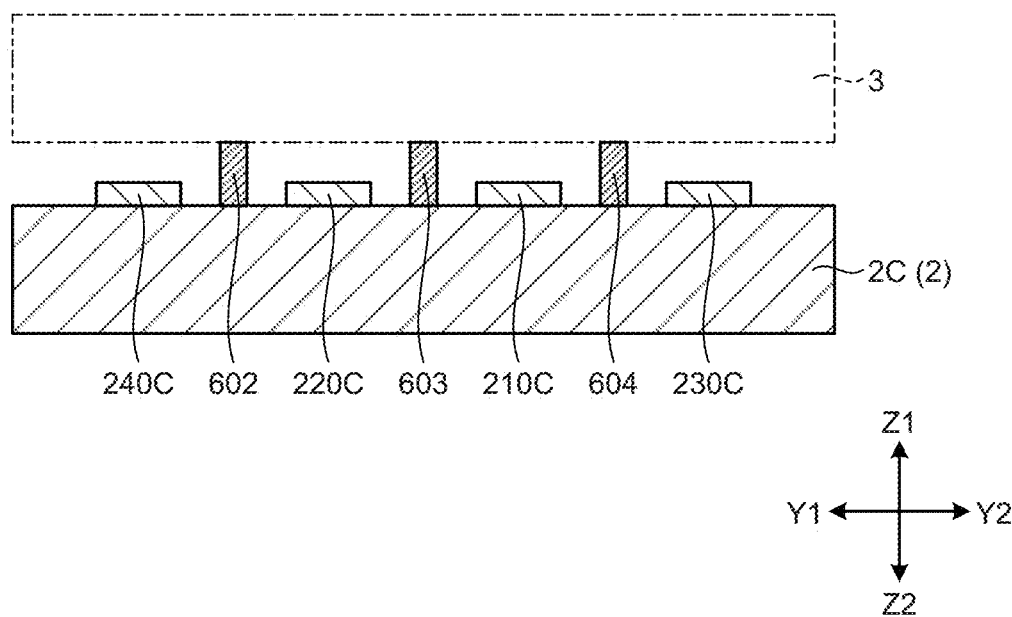
FIG. 38 is a sectional view along line XXXVIII-XXXVIII in FIG. 37.

The following describes a ninth modification. FIG. 37 is a plan view of each array substrate in a light adjustment device according to the ninth modification. FIG. 38 is a sectional view along line XXXVIII-XXXVIII in FIG. 37.

As illustrated in FIGS. 37 and 38, in the ninth modification, partition parts 602, 603, and 604 of the seal 600 are provided between terminals adjacent to each other in the Y direction among a plurality of terminals (first terminals 210C, 220C, 230C, and 240C) on each array substrate 2. The seal 600 includes an annular part 601 and the partition parts 602, 603, and 604. The inner periphery side of the annular part 601 is filled with the liquid crystal layer 4. The partition parts 602, 603, and 604 extend from the annular part 601 toward the X2 side. The partition part 602 is positioned between the first terminals 240C and 220C. The partition part 603 is positioned between the first terminals 220C and 210C. The partition part 604 is positioned between the first terminals 210C and 230C.

As described above, in the ninth modification, since the partition parts 602, 603, and 604 are provided between the terminals 210C, 220C, 230C, and 240C, short circuit between adjacent terminals can be prevented.

What is claimed is:

1. A light adjustment device comprising:
   a panel unit in which a plurality of light adjustment panels are stacked in a first direction, each light adjustment panel including a first substrate and a second substrate, the first substrate including a first terminal, the second substrate overlapping the first substrate and including a second terminal;
   an external coupling wire coupled to at least one of the first and the second terminals; and
   a conductive member that is provided at an end part of the panel unit in a second direction intersecting the first direction and extends in the first direction,
   wherein
   the conductive member
      extends from a light adjustment panel positioned closest to one side in the first direction in the panel unit to a light adjustment panel positioned closest to another side, and
      couples the first terminal on the first substrate and the second terminal on the second substrate in each of the light adjustment panels, and
   in each of the light adjustment panels, the first terminal on the first substrate and the second terminal on the second substrate are coupled to each other through a conduction body, and the conductive member is coupled to the conduction body.

2. The light adjustment device according to claim 1, wherein
   each of the light adjustment panels is shaped like a polygon when viewed in the first direction, and
   each of the first and the second terminals includes a straight part of a strip-shaped body extending along a side of the polygon.

3. The light adjustment device according to claim 1, wherein as for the first and the second substrates included in one of the light adjustment panels, an end part of at least one surface on one side in the second direction among a front surface of the first substrate on the second substrate side and a front surface of the second substrate on the first substrate side includes a chamfered part where distance between the first and the second substrates in the first direction increases toward the one side in the second direction.

4. The light adjustment device according to claim 1, wherein as for the first and the second substrates included in one of the light adjustment panels, an end part of at least one surface on one side in the second direction among a front surface of the first substrate on the second substrate side and a front surface of the second substrate on the first substrate side includes a curved surface part where distance between the first and the second substrates in the first direction increases toward the one side in the second direction and that is curved in a convex shape.

5. The light adjustment device according to claim 1, wherein the conductive member includes a first layer containing silver and a second layer stacked on the first layer and containing carbon.

6. The light adjustment device according to claim 1, wherein a side surface provided at an end part of at least one of the first and the second substrates on the second direction side includes an uneven part.

7. A light adjustment device comprising:
   a panel unit in which a plurality of light adjustment panels are stacked in a first direction, each light adjustment panel including a first substrate and a second substrate, the first substrate including a first terminal, the second substrate overlapping the first substrate and including a second terminal;
   an external coupling wire coupled to at least one of the first and the second terminals; and
   a conductive member that is provided at an end part of the panel unit in a second direction intersecting the first direction and extends in the first direction,
   wherein
   the conductive member
      extends from a light adjustment panel positioned closest to one side in the first direction in the panel unit to a light adjustment panel positioned closest to another side, and couples the first terminal on the first substrate and the second terminal on the second substrate in each of the light adjustment panels, in the light adjustment panel provided in the panel unit and positioned closest to the one side in the first direction, the second substrate is disposed on the one side of the first substrate in the first direction, a translucent conductive film coupled to the conductive member is formed on a surface of the second substrate on the one side in the first direction, and the translucent conductive film is coupled to the external coupling wire.

8. The light adjustment device according to claim 7, wherein
each of the light adjustment panels is shaped like a polygon when viewed in the first direction, and
each of the first and the second terminals includes a straight part of a strip-shaped body extending along a side of the polygon.

9. The light adjustment device according to claim 7, wherein as for the first and the second substrates included in one of the light adjustment panels, an end part of at least one surface on one side in the second direction among a front surface of the first substrate on the second substrate side and a front surface of the second substrate on the first substrate side includes a chamfered part where distance between the first and the second substrates in the first direction increases toward the one side in the second direction.

10. The light adjustment device according to claim 7, wherein as for the first and the second substrates included in one of the light adjustment panels, an end part of at least one surface on one side in the second direction among a front surface of the first substrate on the second substrate side and a front surface of the second substrate on the first substrate side includes a curved surface part where distance between the first and the second substrates in the first direction increases toward the one side in the second direction and that is curved in a convex shape.

11. The light adjustment device according to claim 7, wherein the conductive member includes a first layer containing silver and a second layer stacked on the first layer and containing carbon.

12. The light adjustment device according to claim 7, wherein a side surface provided at an end part of at least one of the first and the second substrates on the second direction side includes an uneven part.

13. The light adjustment device according to claim 7, wherein in each of the light adjustment panels, the first terminal on the first substrate and the second terminal on the second substrate are coupled to each other through a conduction body, and the conductive member is coupled to the conduction body.

14. A light adjustment device comprising:
a panel unit in which a plurality of light adjustment panels are stacked in a first direction, each light adjustment panel including a first substrate and a second substrate, the first substrate including a first terminal, the second substrate overlapping the first substrate and including a second terminal;
an external coupling wire coupled to at least one of the first and the second terminals; and
a conductive member that is provided at an end part of the panel unit in a second direction intersecting the first direction and extends in the first direction, wherein
the conductive member
extends from a light adjustment panel positioned closest to one side in the first direction in the panel unit to a light adjustment panel positioned closest to another side, and
couples the first terminal on the first substrate and the second terminal on the second substrate in each of the light adjustment panels, in the light adjustment panel positioned closest to the other side in the first direction in the panel unit, the second substrate is disposed on the one side of the first substrate in the first direction, a translucent conductive film coupled to the conductive member is formed on a surface of the first substrate on the other side in the first direction, and the translucent conductive film is coupled to the external coupling wire.

15. The light adjustment device according to claim 14, wherein
each of the light adjustment panels is shaped like a polygon when viewed in the first direction, and
each of the first and the second terminals includes a straight part of a strip-shaped body extending along a side of the polygon.

16. The light adjustment device according to claim 14, wherein as for the first and the second substrates included in one of the light adjustment panels, an end part of at least one surface on one side in the second direction among a front surface of the first substrate on the second substrate side and a front surface of the second substrate on the first substrate side includes a chamfered part where distance between the first and the second substrates in the first direction increases toward the one side in the second direction.

17. The light adjustment device according to claim 14, wherein as for the first and the second substrates included in one of the light adjustment panels, an end part of at least one surface on one side in the second direction among a front surface of the first substrate on the second substrate side and a front surface of the second substrate on the first substrate side includes a curved surface part where distance between the first and the second substrates in the first direction increases toward the one side in the second direction and that is curved in a convex shape.

18. The light adjustment device according to claim 14, wherein the conductive member includes a first layer containing silver and a second layer stacked on the first layer and containing carbon.

19. The light adjustment device according to claim 14, wherein a side surface provided at an end part of at least one of the first and the second substrates on the second direction side includes an uneven part.

20. The light adjustment device according to claim 14, wherein in each of the light adjustment panels, the first terminal on the first substrate and the second terminal on the second substrate are coupled to each other through a conduction body, and the conductive member is coupled to the conduction body.

\* \* \* \* \*